US007291834B2

(12) United States Patent
Gonin et al.

(10) Patent No.: US 7,291,834 B2
(45) Date of Patent: Nov. 6, 2007

(54) MULTI-ANODE DETECTOR WITH INCREASED DYNAMIC RANGE FOR TIME-OF-FLIGHT MASS SPECTROMETERS WITH COUNTING DATA ACQUISITIONS

(75) Inventors: Marc Gonin, Bern (CH); Valeri V. Raznikov, Moscow (RU); Katrin Fuhrer, Bern (CH); J. Albert Schultz, Houston, TX (US); Michael I. McCully, Houston, TX (US)

(73) Assignee: Ionwerks, Inc., Houston, TX (US)

( * ) Notice: Subject to any disclaimer, the term of this patent is extended or adjusted under 35 U.S.C. 154(b) by 0 days.

(21) Appl. No.: 11/514,862

(22) Filed: Sep. 1, 2006

(65) Prior Publication Data

US 2007/0018113 A1 Jan. 25, 2007

Related U.S. Application Data

(63) Continuation of application No. 10/856,397, filed on May 28, 2004, now Pat. No. 7,145,134, which is a continuation of application No. 10/638,799, filed on Aug. 11, 2003, now Pat. No. 6,909,090, which is a continuation of application No. 10/025,508, filed on Dec. 19, 2001, now Pat. No. 6,747,271.

(51) Int. Cl.
*B01D 59/44* (2006.01)
*H01J 49/00* (2006.01)

(52) U.S. Cl. ....................................... 250/287; 250/299

(58) Field of Classification Search ................ 250/287, 250/299, 300

See application file for complete search history.

(56) References Cited

U.S. PATENT DOCUMENTS

| | | | |
|---|---|---|---|
| 2,645,734 | A | 7/1953 | Rajchman |
| 4,691,160 | A | 9/1987 | Ino |
| 4,870,265 | A | 9/1989 | Asmussen et al. |
| 5,061,850 | A | 10/1991 | Kelly et al. |

(Continued)

FOREIGN PATENT DOCUMENTS

SU 851549 7/1981

(Continued)

OTHER PUBLICATIONS

Barbacci, D. C., et al.—Multi-node Detection in Electrospray Ionization Time-of-Flight Mass Spectrometry; J Am Soc Mass Spectrom 1998, 9, 1328-1333; Elsevier Science, Inc., College Station, TX 77843, Brazos County, Texas.

(Continued)

*Primary Examiner*—Nikita Wells
*Assistant Examiner*—Johnnie L Smith, II
(74) *Attorney, Agent, or Firm*—Fulbright & Jaworski L.L.P.

(57) ABSTRACT

A detection scheme for time-of-flight mass spectrometers is described that extends the dynamic range of spectrometers that use counting techniques while avoiding the problems of crosstalk. It is well known that a multiple anode detector capable of detecting different fractions of the incoming particles may be used to increase the dynamic range of a TOFMS system. However, crosstalk between the anodes limits the amount by which the dynamic range may be increased. The present invention overcomes limitations imposed by crosstalk by using either a secondary amplification stage or by using different primary amplification stages.

10 Claims, 27 Drawing Sheets

U.S. PATENT DOCUMENTS

| | | | | |
|---|---|---|---|---|
| 5,166,521 | A | 11/1992 | Hayashi et al. | |
| 5,367,162 | A | 11/1994 | Holland et al. | |
| 5,644,128 | A | 7/1997 | Wollnik et al. | |
| 5,689,152 | A | 11/1997 | Boutot et al. | |
| 5,777,325 | A | 7/1998 | Weinberger et al. | |
| 6,229,142 | B1 | 5/2001 | Bateman et al. | |
| 6,373,052 | B1 | 4/2002 | Hoyes et al. | |
| 6,617,768 | B1 | 9/2003 | Hansen | |
| 6,674,068 | B1 | 1/2004 | Kammei | |
| 6,747,271 | B2 * | 6/2004 | Gonin et al. | 250/281 |
| 6,800,847 | B2 | 10/2004 | Axelsson | |
| 6,812,454 | B2 * | 11/2004 | Gonin | 250/287 |
| 6,864,479 | B1 | 3/2005 | Davis et al. | |
| 7,060,973 | B2 * | 6/2006 | Gonin | 250/287 |
| 7,145,134 | B2 * | 12/2006 | Gonin et al. | 250/287 |
| 2002/0175292 | A1 | 11/2002 | Whitehouse et al. | |

FOREIGN PATENT DOCUMENTS

| | | |
|---|---|---|
| WO | 98/21742 | 5/1998 |
| WO | WO-99/38190 | 7/1999 |
| WO | WO-99/38192 | 7/1999 |
| WO | WO-9938191 | 7/1999 |
| WO | WO-99/67801 | 12/1999 |
| WO | WO-01/18846 A2 | 3/2001 |

OTHER PUBLICATIONS

Kristo, et al.—System for simultaneous count/current measurement with a dual-mode photon/particle detector; 1988 American Institute of Physics. Rev. Sci. Instrum. .59(3), Mar. 1988, pp. 438-442; Michigan State University, East Lansing, Michigan.

* cited by examiner

Big Anode
Small Anode
0.1 ion extraction
1 ion/extr.
4 ion/extr.
0.01 ion/extr.
0.1 ion/extr.
0.4 ion/extr.

counts
10ns
TOF [ns]
TOF [ns]

MULTI-ANODE DETECTOR WITH INCREASED DYNAMIC RANGE FOR TIME-OF-FLIGHT MASS SPECTROMETERS WITH COUNTING DATA ACQUISITIONS

CROSS REFERENCE TO RELATED APPLICATIONS

The present application is a continuation application of U.S. Ser. No. 10/856,397 filed on May 28, 2004 now U.S. Pat. No. 7,145,134, which is a continuation application of U.S. Ser. No. 10/638,799 filed Aug. 11, 2003, now U.S. Pat. No. 6,909,090, which is a continuation of U.S. Ser. No. 10/025,508 filed Dec. 19, 2001, now U.S. Pat. No. 6,747, 271.

FIELD OF THE INVENTION

The present invention is directed toward particle recording in multiple anode time-of-flight mass spectrometers using a counting acquisition technique.

BACKGROUND

Time-of-Flight Mass Spectrometry ("TOFMS") is a commonly performed technique for qualitative and quantitative chemical and biological analysis. Time-of-flight mass spectrometers permit the acquisition of wide-range mass spectra at high speeds because all masses are recorded simultaneously. As shown in FIG. 1, most time-of-flight mass spectrometers operate in a cyclic extraction mode and include primary beam optics 7 and time-of-flight section 3. In each cycle, ion source 1 produces a stream of ions 4, and a certain number of particles 5 (up to several thousand in each extraction cycle) travel through extraction entrance slit 26 and are extracted in extraction chamber 20 using pulse generator 61 and high voltage pulser 62. The particles then traverse flight section 33 (containing ion accelerator 32 and ion reflector 34) towards a detector, which in FIG. 1 consists of micro-channel plate ("MCP") 41, anode 44, preamplifier 58, constant fraction discriminator ("CFD") 59, time-to-digital converter ("TDC") 60, and computer ("PC") 70. Each particle's time-of-flight is recorded so that information about its mass may be obtained. Thus, in each extraction cycle a complete time spectrum is recorded and added to a histogram. The repetition rate of this extraction cycle is commonly in the range of 10 Hz to 100 kHz.

If several particles of one species are extracted in one cycle, then these particles will arrive at the detector within a very short time period (possibly as short as 1 nanosecond). When using an analog detection scheme (such as a transient recorder in which the flux of charge generated by the incoming ions is recorded as a function of time), this near simultaneous arrival of particles does not cause a problem because analog schemes create a signal that is, on average, proportional to the number of particles arriving within a certain sampling interval. However, when a counting detection scheme is used (such as a time-to-digital converter in which individual particles are detected and their arrival times are recorded), the electronics may not be able to distinguish particles of the same species when those particles arrive too closely grouped in time. (A single signal is produced when a particle impinges upon the counting electronics. The signal produced by the detector is a superposition of the single signals that occur within a sampling interval.) Further, most time-to-digital converters have dead times (typically 20 nanoseconds) that effectively prevent the detection of more than one particle per species during one extraction cycle.

For example, when analyzing an air sample with twelve particles per cycle, there will be approximately ten nitrogen molecules (80% $N_2$ in air with mass of 28 amu) per cycle. In a time-of-flight mass spectrometer having good resolving power, these ten $N_2$ particles will hit the detector within two nanoseconds. Even a fast TDC with a half nanosecond bin width will not be able to detect all of these particles. Thus, the detection system will become saturated at this intense peak. FIG. 2 shows these ten particles 6 impinging upon a detector consisting of electron multiplier 41 (with MCP upper bias voltage (75) and MCP lower bias voltage (76) as indicated), single anode 44, preamplifier 58, CFD 59, TDC 60, and PC 70. (MCP 41 in FIG. 2 consists of two chevron mounted multichannel plates. As would be apparent to one of skill in the art, circuitry would also be included to complete the electrical connection between the upper and lower plates. This additional circuitry is not shown in the figures.) TDC 60 will register only the first of these ten particles. The remaining nine particles will not be registered. Because only the first particle is registered, peaks for the abundant species ($N_2$ and $O_2$) will be artificially small and will be recorded too early, resulting in an artificially sharpened peak whose centroid is shifted to an earlier and incorrect time of flight. These two undesirable effects—incorrect intensity and artificially shortened time of flight—are referred to as anode/TDC saturation effects. These anode/TDC saturation effects are therefore different from the electron multiplier gain reduction (sometimes called multiplier saturation) that occurs when too many ions impinge the electron multiplier so that the electron multiplier is no longer able to generate an electron flux that is proportional to the flux of the incoming ions.

In an attempt to overcome anode/TDC saturation effects, some detectors use multiple anodes, each of which is recorded by an individual TDC channel. (An anode is the part of a particle detector that receives the electrons from the electron multiplier.) FIG. 3 shows such a detector with a single electron multiplier 41 and four anodes 45 of equal size. Each of the four anodes is connected to a separate preamplifier 58 and CFD 59. Each of the four CFDs is connected to TDC 60 and PC 70. This configuration permits the identification of intensities that are four times larger than those obtainable with a single anode detector. However, even with four anodes, the detection of the ten $N_2$ particles 6 leads to saturation since on average there will still be more than one particle arrival per anode. In principle, anode/TDC saturation could be avoided entirely by adding even more anodes. However, this solution is complex and expensive since each additional anode requires its own TDC channel.

Instead of using multiple anodes that each receive the same fraction of the incoming ions, one may use multiple anodes in which each anode receives a different fraction of the incoming ions. (The anode fraction is the fraction of the total number of ions that is detected by a specific anode.) By appropriately reducing this fraction, anode/TDC saturation effects can be reduced. See, for example, PCT Application WO 99/67801A2, which is incorporated herein by reference. One way to provide anodes that receive different fractions of the incoming ions is to provide electron multiplier 41 followed by anodes of different physical sizes as shown in FIG. 4, in which large anode 46 is located adjacent to small anode 47. As before, each anode is connected to a separate preamplifier 58 and CFD 59, and the CFDs are connected to TDC 60 and PC 70. In the example of FIG. 4, two unequal sized anodes are provided having a size ratio of approximately 1:9. As a result, the small anode detects only one $N_2$ particle per cycle, which is just on the edge of saturation. Less abundant particles such as Ar (1% abundance in air and thus 0.12 particles per cycle) are detected without saturation on the large anode. Thus, with two anodes of unequal size it is possible to increase the dynamic range by a factor of approximately ten or more. A multi-anode detector with equal sized anodes would require ten anodes to obtain the same improvement.

In theory, the dynamic range of the unequal anode detector can be further reduced by further decreasing the size of the small anode fraction or by including additional anodes with even lower fractions. However, this theoretical increase in dynamic range is prevented by the presence of crosstalk from the larger anodes to the smaller anodes. In typical multi-anode detectors, the crosstalk from one anode to an adjacent anode ranges approximately from 1% to 10% when a single ion hits the detector. Thus, if 10 particles are detected simultaneously on a large fraction anode, the crosstalk to an adjacent small fraction anode may range from 10% to 100%. In such cases the small anode would almost always falsely indicate a single particle signal.

Bateman et al. (PCT Application WO 99/38190) disclose the dual stage detector shown in FIG. 5 where anode 47, in the form of a grid or a wire, is placed between MCP electron multipliers 41 and 50. However, instead of distributing different fractions of the incoming ion events (i.e., incoming particles 6) among different anodes, the detector of FIG. 5 distributes the secondary electrons of each ion event. They consider anode 47 to be the anode on which saturation effects are impeded. If anode 47 is a 10% grid, then anodes 47 and 46 each receive the same number of ion signals. The ion signals on anode 46, however, are larger (on average) because of the additional amplification provided by MCP 50. This type of additional amplification is useful in an analog acquisition scheme or in a combined analog/TDC acquisition system, in which the same principle has been used with dynode multipliers. However, in a pure TDC (or counting) acquisition system, increasing the dynamic range with two anodes of equal signal rates, but unequal signal sizes, is quite difficult.

Bateman et al. also suggest using different threshold levels on discriminators 59 to achieve different count rates on the two anodes. This suggestion, however, makes the detection characteristics largely dependent on the pulse height distribution of the MCPs. Also, the same technique could be applied with a single gain detector. Further, placing the small anode between the MCP and the large anode results in extensive crosstalk from the large anode to the small anode.

An object of the present invention is to provide a method and apparatus for reducing crosstalk and increasing dynamic range in multiple anode detectors. That is, an object of the present invention is to reduce crosstalk from anodes receiving a larger fraction of the incoming ions to those anodes that receive a smaller fraction of the incoming ions, thereby reducing the occurrence of false signals on the small fraction anode. A further object of the present invention is to provide a minimum variance procedure for combining—either in real time or off line—the counts from the separate anodes. A further object of the present invention is to provide a detector and associated electronics that will combine the signals from any mixture of small and large anodes to achieve a real time correction of ion peak intensity and centroid shift. A further objective of the present invention is to extend the dynamic range of a multi-anode detector by providing multiple electron multiplier stages where the electron multiplier gain reduction that occurs after the first stage is minimized in subsequent stages.

SUMMARY OF THE INVENTION

An ion detector in a time-of-flight mass spectrometer for detecting a first ion arrival signal and a second ion arrival signal is disclosed comprising a first electron multiplier with a first gain for producing a first group of electrons in response to the first ion arrival signal and for producing a second group of electrons in response to the second ion arrival signal. (Note that "first" and "second" are not temporal designations. In particular, the first ion arrival signal and the second ion arrival signal may occur simultaneously or in any temporal order.) Also disclosed is a first anode for receiving the first group of electrons but for not receiving the second group of electrons, thereby producing a first output signal in response to the first ion arrival signal. In addition, a second electron multiplier with a second gain greater than the first gain is disclosed for producing a third group of electrons in response to the second group of electrons but not in response to the first group of electrons. In addition, a second anode is disclosed for receiving the third group of electrons, thereby producing a second output signal in response to the second ion arrival signal. Finally, detection circuitry is disclosed that is connected to the first anode and the second anode for providing time-of-arrival information for the first ion arrival signal and the second ion arrival signal based on the first output signal and the second output signal.

An additional embodiment is disclosed in which the second electron multiplier is a micro-channel plate. In a further embodiment, the second electron multiplier is a channel electron multiplier. In yet another embodiment, the second electron multiplier is a photo multiplier. In an additional embodiment, the first electron multiplier comprises a micro-channel plate and an amplifier. In a further embodiment, a scintillator is positioned between the micro-channel plate and the amplifier.

In another embodiment, the detection circuitry comprises a first preamplifier receiving the first output signal from the first anode to produce a first amplified output signal, a second preamplifier receiving the second output signal from the second anode to produce a second amplified output signal, a first discriminator receiving the first amplified output signal to produce a first time-of-arrival signal, a second discriminator receiving the second amplified output signal to produce a second time-of-arrival signal, and a time to digital converter receiving the first time-of-arrival signal and the second time-of-arrival signal. In one embodiment, the first and second discriminators are constant fraction discriminators. In another embodiment, the first and second discriminators are level crossing discriminators.

In one embodiment a crosstalk shield is positioned between the first anode and the second anode. In another embodiment, an electrode is positioned to attenuate the ion arrival signals received by the second anode. In a further embodiment, detection circuitry is connected to the electrode for providing time-of-arrival information based on the ion arrival signals received by the electrode.

Also disclosed is a method for determining the times of arrival of a first ion arrival signal and a second ion arrival signal in a time-of-flight mass spectrometer, comprising the steps of providing a first electron multiplier with a first gain, producing from the first electron multiplier a first group of electrons in response to the first ion arrival signal, producing from the first electron multiplier a second group of electrons in response to the second ion arrival signal, providing a first anode, directing the first group of electrons so that the first group is received by the first anode, thereby producing a first output signal in response to the first ion arrival signal, directing the second group of electrons so that the second group is not received by the first anode, providing a second electron multiplier with a second gain greater than the first gain, producing from the second electron multiplier a third group of electrons in response to the second group of electrons but not in response to the first group of electrons, providing a second anode, directing the third group of electrons so that the third group is received by the second anode, thereby producing a second output signal in response to the second ion arrival signal, and calculating the times of arrival of the first ion arrival signal and the second ion arrival signal based on the first output signal and the second output signal.

Also disclosed is a method for combining TDC data collected from a plurality of anodes in an unequal anode detector comprising the steps of recording a histogram for each anode from the plurality of anodes, determining the effective number of TOF extractions seen by each anode from the plurality of anodes, determining the recorded number of counts on each anode from the plurality of anodes, estimating the number of impinging ions detected by each anode from the plurality of anodes, and correcting the recorded histogram for each anode from the plurality of anodes by substituting the estimate, and combining the corrected histograms into a weighted linear combination of minimal total variance. In an additional embodiment, the combining step comprises determining the fraction of incoming ions received by each anode from the plurality of anodes, and determining weights so that the weights sum to unity and so that the weighted combination has minimum variance.

Also disclosed is a method for estimating a global statistic by combining local statistics based on TDC data collected from a plurality of anodes in an unequal anode detector, comprising the steps of recording a histogram for each anode of the plurality of anodes, correcting each histogram for dead time effects by estimating the total number of particles impinging upon each anode of the plurality of anodes, thereby producing a plurality of corrected histograms, evaluating a local statistic for each corrected histogram, and combining the local statistics into a weighted linear combination to produce a global statistic with minimum total variance. In one embodiment, the local statistics are peak areas. In another embodiment, the local statistics are centroid positions. In a further embodiment, the local statistics are positions of peak maxima.

Also disclosed is a time-of-flight mass spectrometer, comprising an ion source producing a stream of ions, an extraction chamber receiving a portion of the stream of ions from the ion source, a flight section receiving the portion of ions from the extraction chamber and accelerating the portion of ions to produce a first accelerated stream of ions and a second accelerated stream of ions spatially separated from the first accelerated stream of ions, a detector receiving the first accelerated stream of ions and the second accelerated stream of ions from the flight section. The detector comprises a first electron multiplier with a first gain for producing a first group of electrons in response to the first accelerated stream of ions and for producing a second group of electrons in response to the second accelerated stream of ions, a first anode for receiving the first group of electrons and for not receiving the second group of electrons, thereby producing a first output signal in response to the first accelerated stream of ions, a second electron multiplier with a second gain greater than the first gain for producing a third group of electrons in response to the second group of electrons but not in response to the first group of electrons, a second anode for receiving the third group of electrons, thereby producing a second output signal in response to the second accelerated stream of ions, and detection circuitry connected to the first anode and the second anode for providing time-of-arrival information for the first accelerated stream of ions and the second accelerated stream of ions based on the first output signal and the second output signal. Also included is a data acquisition system for receiving the time-of-arrival information for the first accelerated stream of ions and the second accelerated stream of ions and for combining the time-of-arrival information into a weighted linear combination of minimum total variance.

BRIEF DESCRIPTION OF THE DRAWINGS

FIG. 18E shows the array of the large anodes from the direction of the incoming particles 6, whereas FIG. 18F shows a top view of the array of small anodes.

DETAILED DESCRIPTION

Figure 1:
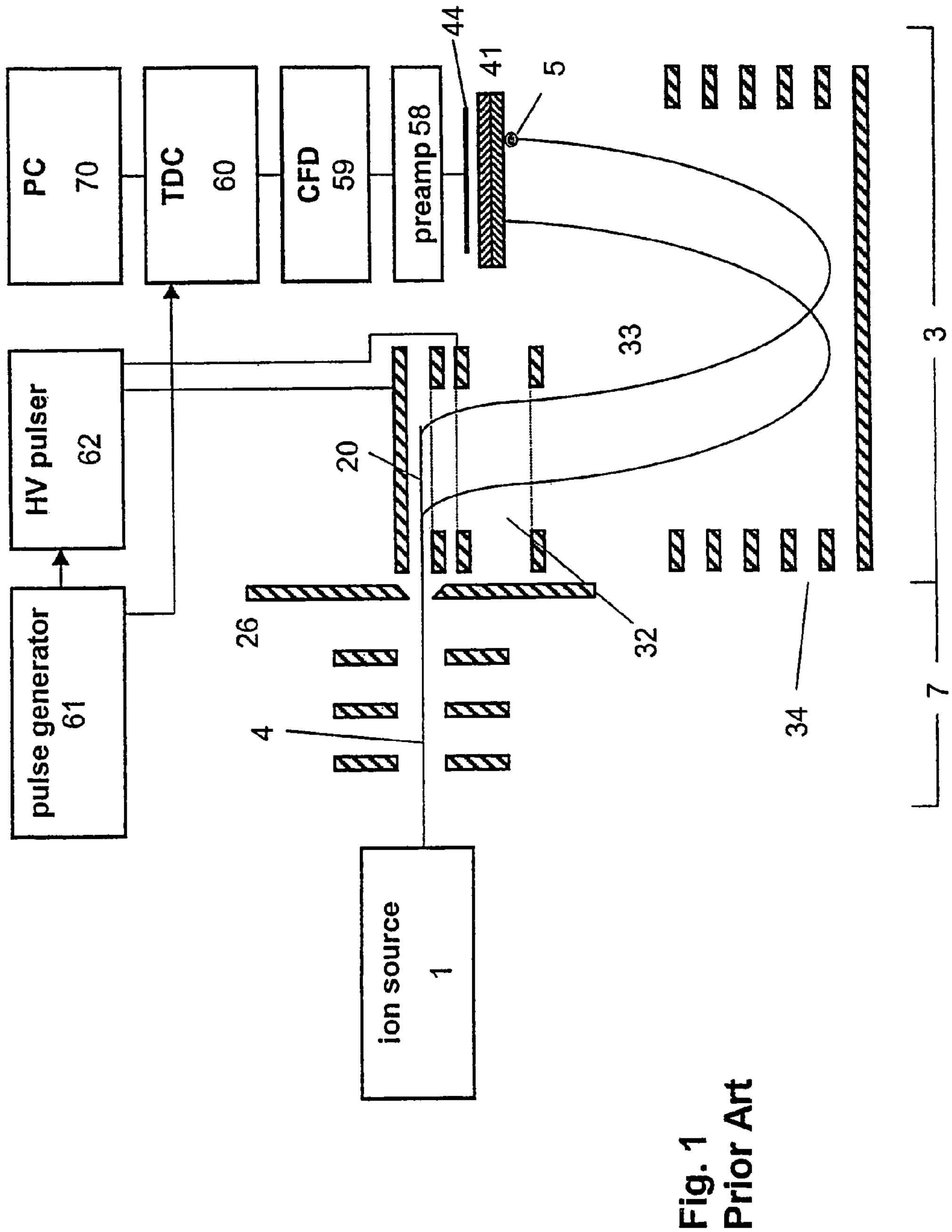
Fig. 1 Prior Art
FIG. 1 is a schematic diagram showing a prior art time-of-flight mass spectrometer to which the present invention may be advantageously applied.
Figure 2:
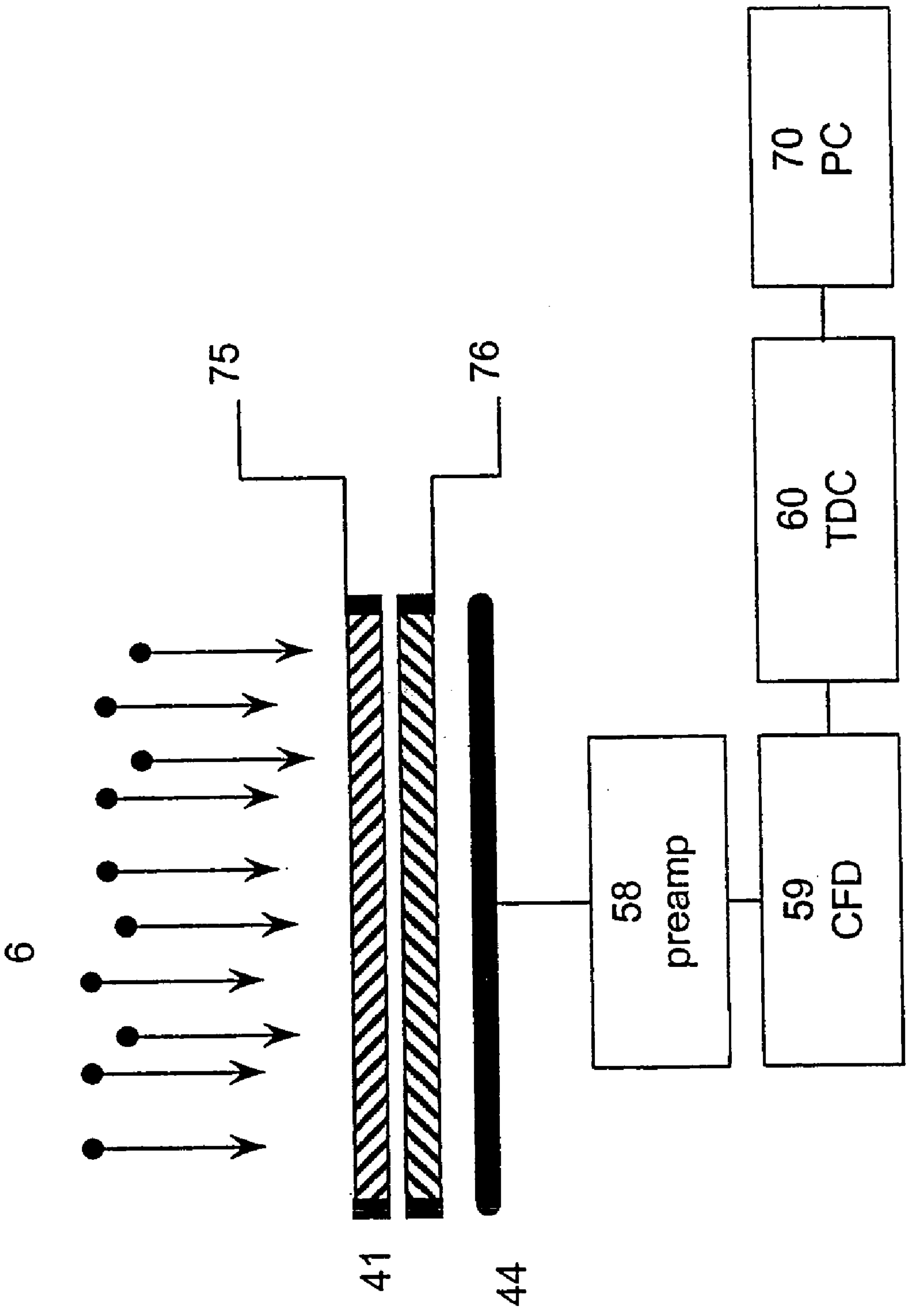
Fig. 2 Prior Art
FIG. 2 is a schematic diagram showing a single anode detector from the prior art.

In a typical time-of-flight mass spectrometer, as shown in FIG. 1, gaseous partides are ionized and accelerated into a flight tube from extraction chamber 20 by the periodic application of voltage from high voltage pulsers 62. A time-of-flight mass spectrometer may (as illustrated in FIG. 1) use reflectors to increase the apparent length of the flight tube and, hence, the resolution of the device. At detector 40 of the time-of-flight mass spectrometer in FIG. 1, ions impinge upon electron multiplier (which is typically a dual microchannel plate multiplier) 41 causing an emission of electrons. Anodes detect the electrons from electron multiplier 41, and the resulting signal is then processed through preamplifier 58, CFD 59, and TDC 60. A histogram reflecting the composition of the sample is generated either in TDC 60 or in digital computer 70 connected to TDC 60.

Figure 6:
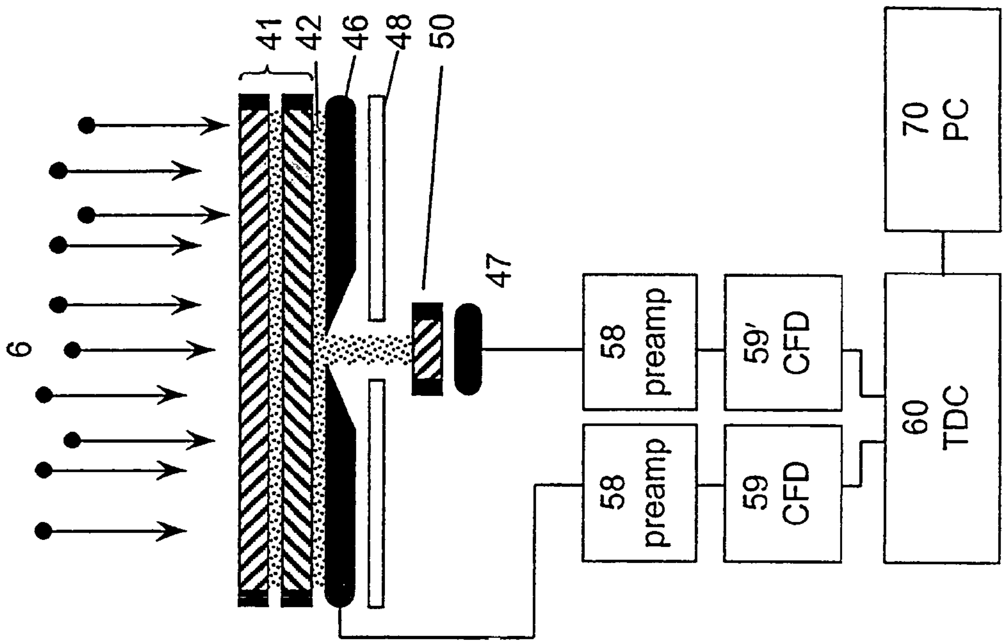
FIG. 6 is a schematic diagram showing a detector of the present invention having a second stage MCP electron multiplier for ion events detected on the small fraction anode.

Referring to FIG. 6, which illustrates a detector according to an embodiment of the present invention, incoming particles 6 impinge upon electron multiplier 41 to produce multiplied electrons 42. Large anode 46 receives a large fraction of the incoming ions and hence becomes saturated for abundant ion species. Small anode 47, however, receives only a small fraction of all incoming ions and hence does not saturate for abundant species. The detection fraction of anode 47 is small enough so that on average it detects only one particle out of the ten incoming particles of the species. (This particular detection fraction is chosen for illustrative purposes. Other detection fractions—including much smaller fractions—may be used without departing from the scope of the present invention.) Large anode 46 may be configured as shown to provide a mask for MCP 50 and small anode 47. Also, as discussed below, crosstalk shield 48 may be positioned as shown to reduce the crosstalk from large anode 46 to small anode 47. Anodes 46 and 47 are connected to separate preamplifiers 58 and CFDs 59, which are connected to TDC 60 and PC 70 as shown.

Figure 4:
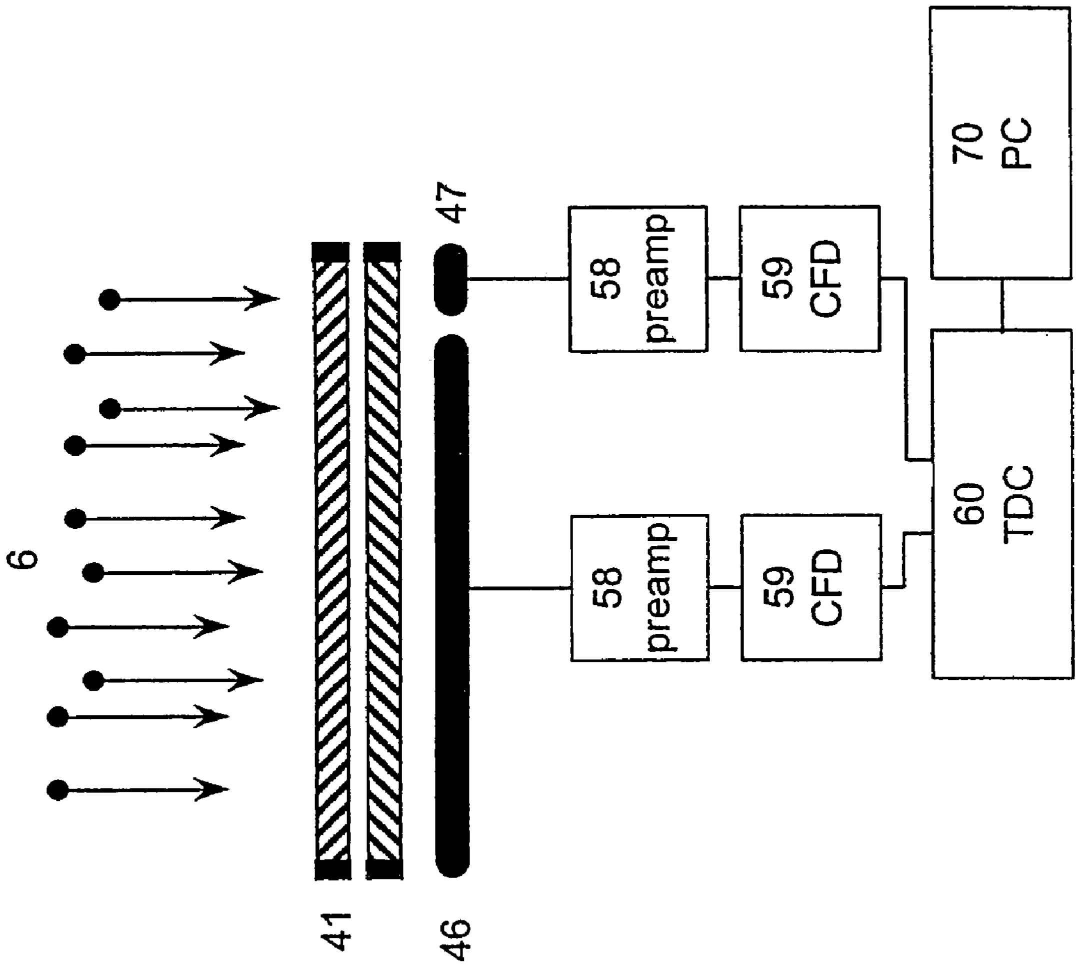
Fig. 4 Prior Art
FIG. 4 is a schematic diagram showing a detector from the prior art having multiple anodes of unequal size.

As discussed above with regard to FIG. 4, it is possible to increase the dynamic range by a factor of ten or more using two anodes of unequal size. A problem with this approach, however, is that crosstalk will generally occur from anode 46 to anode 47. If this crosstalk is 10%, then ten simultaneous ions detected on anode 46 will generate crosstalk on anode 47 of the same intensity as one single ion detected on anode 47. Thus, anode 47 may register an impact even if there was no ion present on anode 47, thus leading to errors in the ion counting measurement.

Figure 5:
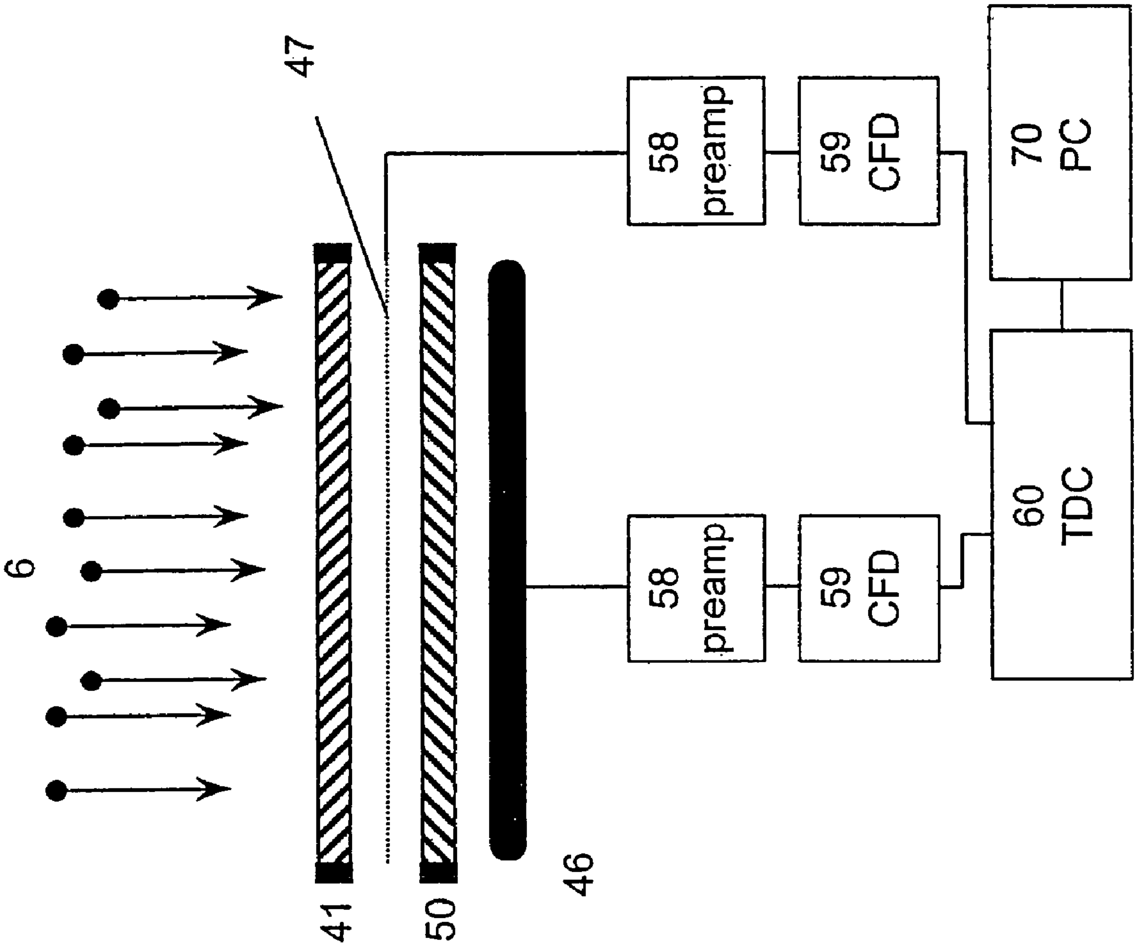
Fig. 5 Prior Art
FIG. 5 is a schematic diagram of a prior art dual stage detector in which an anode in the form of a grid or a wire is placed between two MCP electron multipliers so as to distribute the secondary electrons of each ion event between itself and another anode.

The present invention provides a solution to this crosstalk problem. As shown in FIG. 6, the signal on anode 47 is additionally amplified by second stage electron multiplier 50. This second stage of amplification permits the threshold level on CFD 59' to be increased to such a degree that cross talk from anode 46 will no longer be mistaken for a true ion signal. In particular, the present invention permits one to obtain a larger gain for ions detected on small anode 47 than for ions detected on larger anode 46. This difference in gain may be achieved, for example, by including an additional MCP electron multiplication stage as shown in FIG. 6. This embodiment also has another practical advantage over the approaches in FIG. 4 and FIG. 5. Because the crosstalk from the large to the small anode is greatly reduced, the threshold levels of CFDs 59 and 59' can be lowered consistent with the rejection of electronic signals from other noise sources. Therefore, MCPs 41 and 50 can be operated at a reduced bias voltage. The reduction in bias voltage results in a reduced secondary electron gain in electron multiplier 41 in response to particle flux 6 which in turn both prolongs the lifetime of the MCPs and allows them to respond to an increased particle flux 6.

Figure 7:
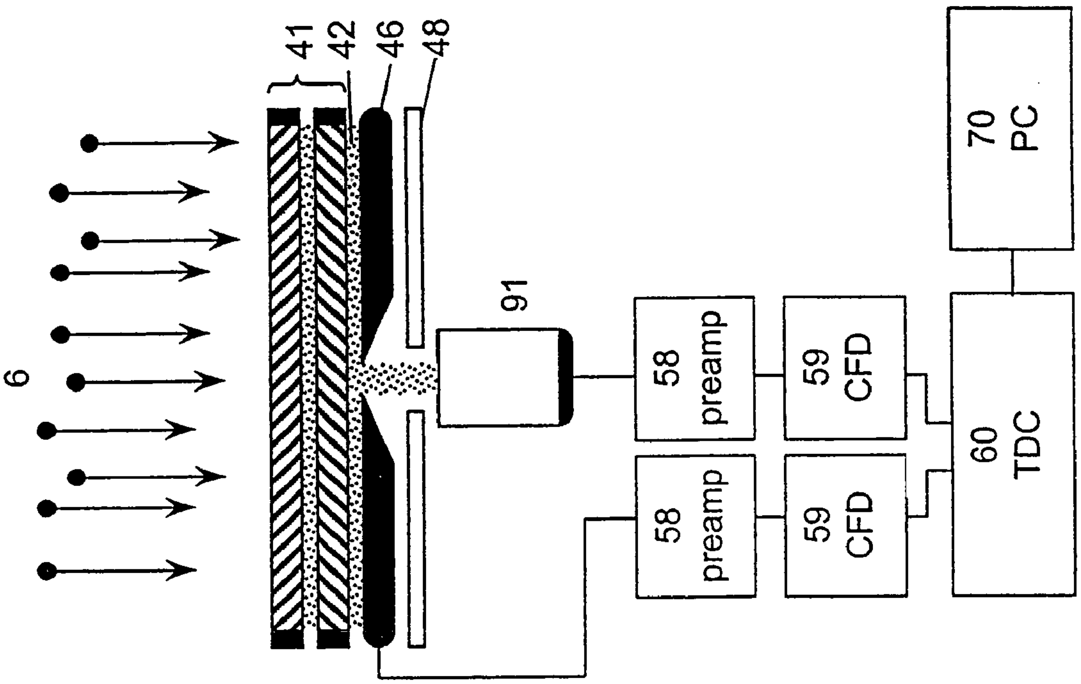
FIG. 7 is a schematic diagram showing an alternate embodiment of the detector of the present invention in which the second stage multiplier is a channel electron multiplier.

Other methods of electron multiplication may also be used in accordance with the present invention. For example, as shown in FIG. 7, Channel Electron Multiplier ("CEM") 91 may be used to provide the second stage multiplication that is provided by MCP 50 in FIG. 6. One skilled in the art will immediately realize that other hybrid combinations of electron multipliers are possible as illustrated, for example, in FIG. 7B, which shows discrete dynode multiplier 94 for the small signal and a combination of one MCP 41 followed by a second electron multiplier comprising a Multi-Spherical Plate (MSP). Such choices of hybrids may be made to optimize detector response for both small and large anodes, increase detector lifetimes, and create detectors with higher count rate capabilities compared to the traditional dual MCP.

Figure 8:
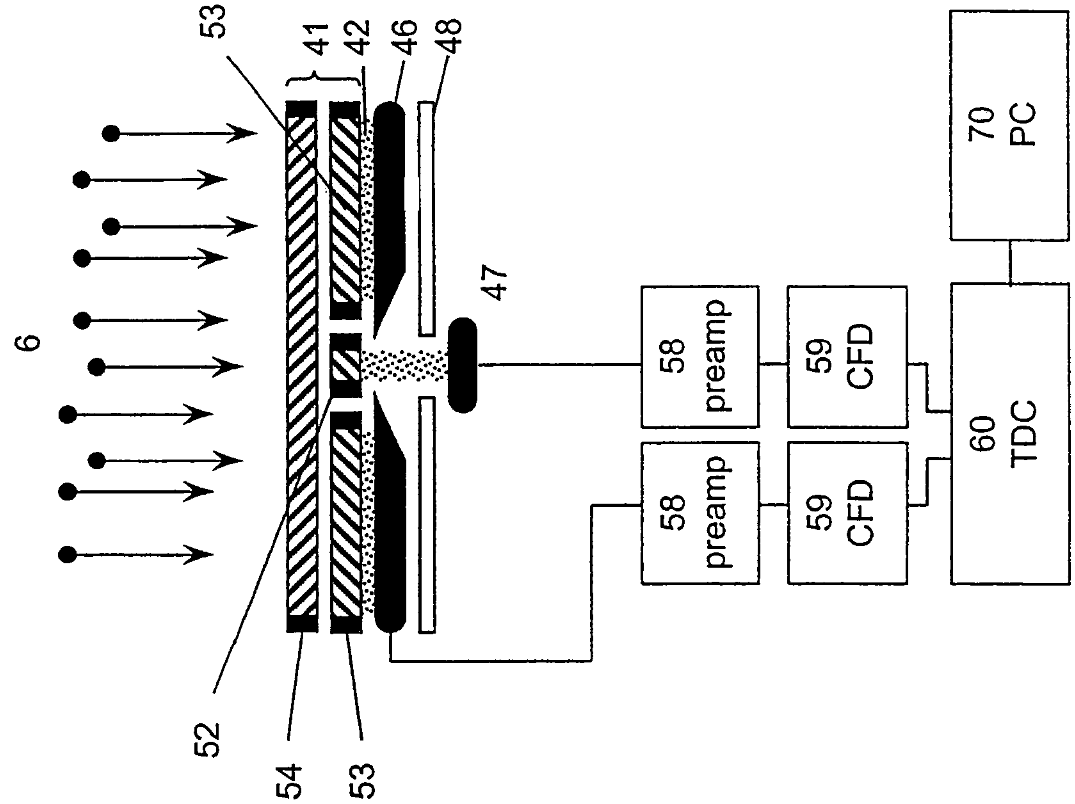
FIG. 8 is a schematic diagram showing an alternate embodiment of the detector of the present invention in which the second stage multiplier is omitted and the first stage multiplier contains a section with a higher electron multiplication (i.e., higher gain) for those ions to be detected on the small fraction anode.
Figure 9:
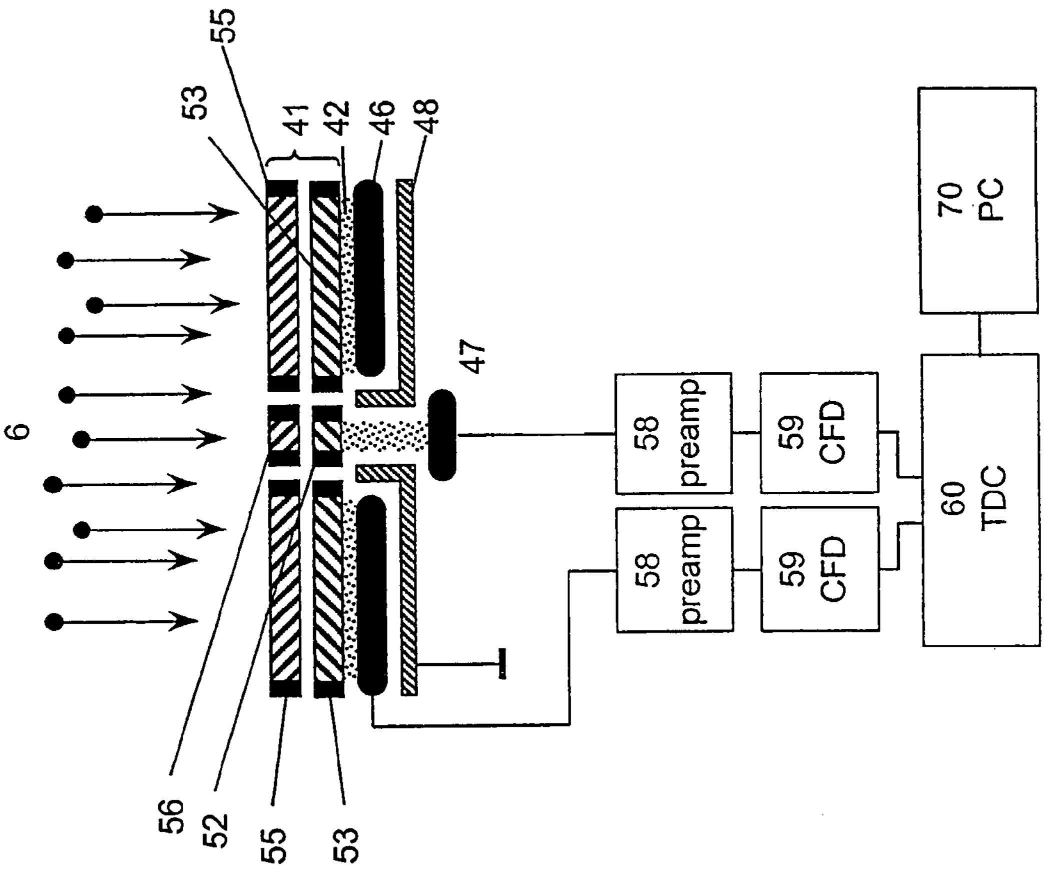
FIG. 9 is a schematic diagram of a modification of the embodiment shown in FIG. 7 in which a separate first stage multiplier (as well as a separate second stage multiplier) is provided for the small fraction anode.

In the embodiments illustrated by FIG. 8 and FIG. 9, a larger amplification is achieved by using MCPs of larger gain for those ions detected with anode 47. In FIG. 8, electron multiplier 41 consists of a single upper MCP 54 followed by a lower MCP 53 positioned in the path of large anodes 46 and a second lower MCP 52 positioned in the path of small anode 47. In FIG. 9, electron multiplier 41 consists of an upper MCP 55 and a lower MCP 53 positioned in the path of large anodes 46 and an upper MCP 56 and a lower MCP 52 positioned in the path of small anode 47. Shielding electrode 48 serves to decrease the crosstalk from anodes 46 to anode 47.

Figure 10:
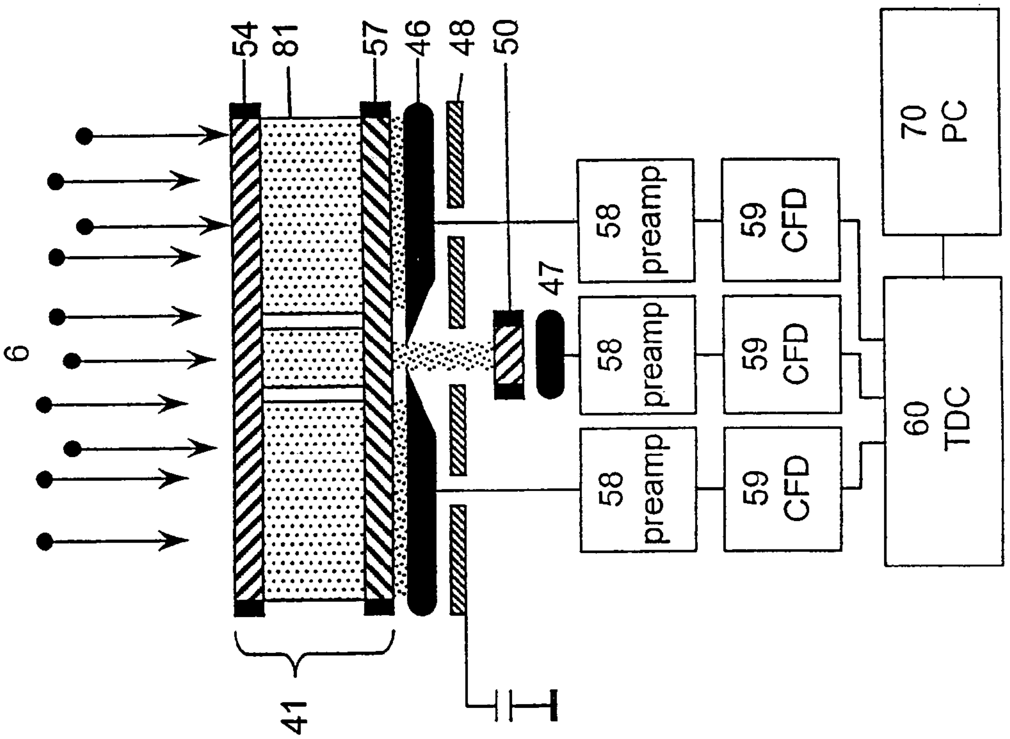
FIG. 10 is a schematic showing a detector of the present invention in which a scintillator is located between the two MCPs of the first stage multiplication to decouple the potential on the front MCP from the remainder of the detector, thereby better enabling the detector to detect ions in a high potential with a TDC acquisition scheme and electronics that are at or near ground potential.
Figure 11:
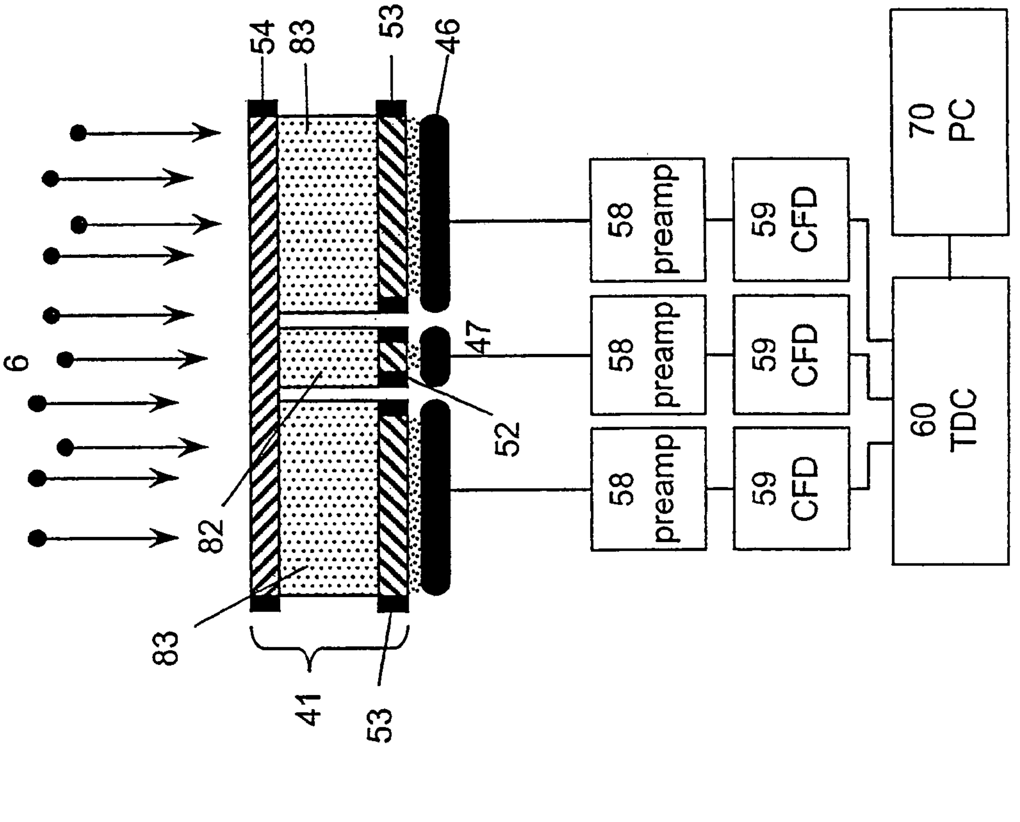
FIG. 11 is a schematic showing an alternate embodiment for using a scintillator detector for high potential measurements.

In certain mass spectrometers, MCP 41 (positioned at the front) operates on a very high potential so as to increase the ion energy upon impingement. In such a case, scintillators can be used to decouple the high potential side of the detector with the low potential side of the detector. FIG. 10 and FIG. 11 illustrate embodiments using this method and incorporating the second stage multiplication for anode 47. Electron multiplier 41 in FIG. 10 consists of scintillators 81 positioned between MCP 54 and MCP 57. Electron multiplier 41 in FIG. 11 consists of large scintillator 82 positioned between upper MCP 54 and lower MCP 53, which is positioned in the path of large anodes 46, and small scintillator 83 positioned between upper MCP 54 and lower MCP 52, which is positioned in the path of small anode 47. FIGS. 10 and 11 each show the MCPs in MCP pair 41 to be of the same size. However, it is not critical that he sizes be equal. Indeed, an advantage is obtained if the lower MCP (57 in FIG. 10 and 53 in FIG. 11) is increased in diameter with a subsequent increase in the diameter of scintillator 81 and 83 and in large anode 46. In particular, if MCP 53 or 57 is larger than MCP 54, then there will be more microchannels available than in MCP 54 and the gain reduction as a function of ion flux for the upper and lower MCP will be more closely comparable than if the MCPs were the same diameter. The function of the enlarged scintillator would then be to diffuse photons onto all available channels of lower MCP 57 or 53. Lower MCP 57 or 53 is understood to contain a photocathode material to reconvert the scintillator photons into electrons for subsequent multiplication by the lower MCP.

Figure 12:
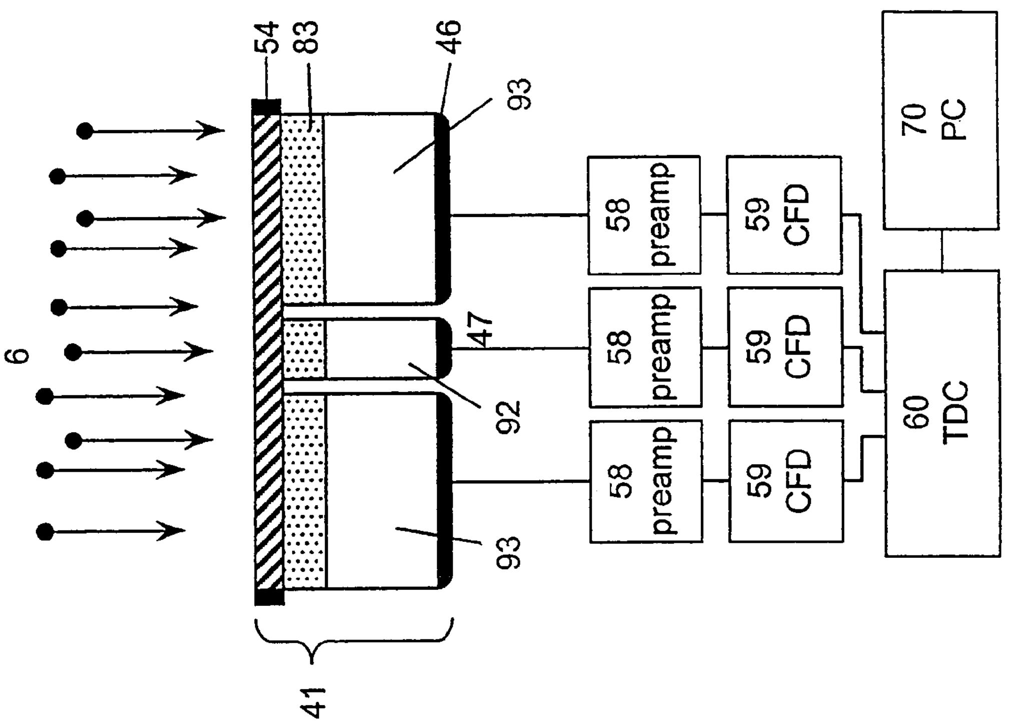
FIG. 12 is a schematic diagram showing an alternate embodiment for using a scintillator detector for high potential measurements with CEMs or PMTs as second stage multipliers.
Figure 13:
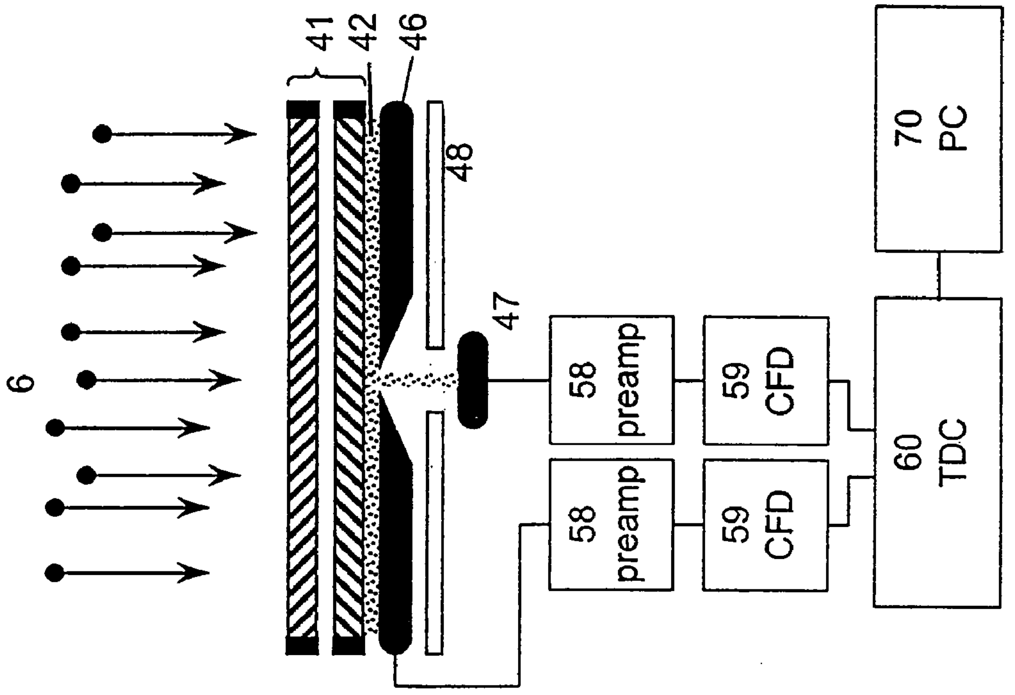
FIG. 13 is a schematic diagram of a detector in which the large anode is configured as a mask to restrict the ion fraction received by the small anode.

FIG. 12 illustrates an embodiment that uses CEMs 92 and 93 in place of MCPs 52 and 53, respectively. As before, CEM 92, which is coupled to small anode 47, preferably has a larger gain than CEM 93. As would be clear to one of skill in the art, the CEMs in the detector of FIG. 12 may be replaced with Photo Multiplier Tubes (PMTs).

Figure 14:
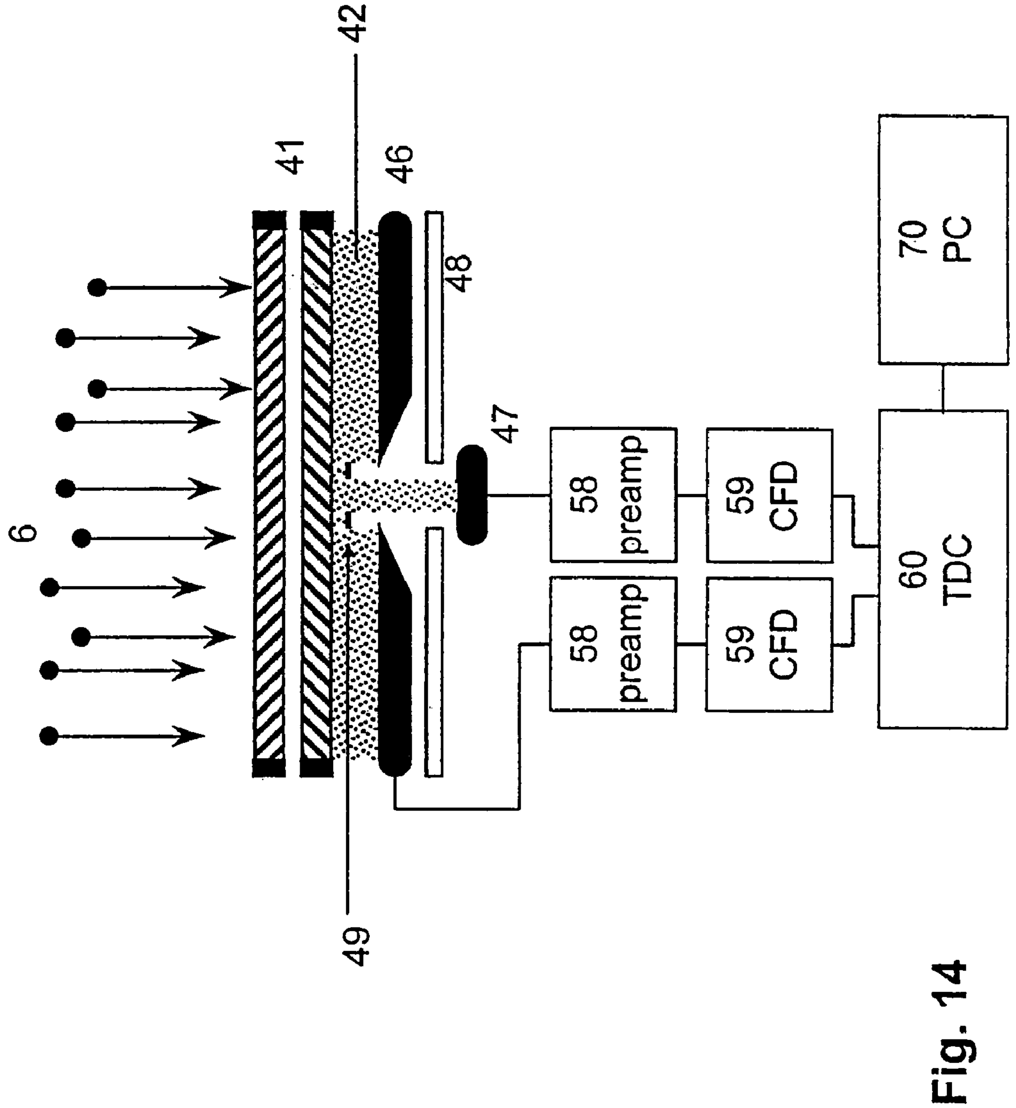
FIG. 14 is a schematic diagram showing a detector in which additional anodes (not connected to detection circuitry) are configured as a mask to restrict the ion fraction received by the small anode.

There are a number of ways for obtaining an unequal anode detector suitable for use with the present invention. For example, one may use anodes of different physical sizes. Alternatively, one may alter the electric and/or magnetic fields or the ion beam and detector geometry to change the fraction of incoming ions detected by a particular anode. One problem that may occur with these methods involves shared signals. In particular, some ions may produce electron clouds that strike more than one anode. These shared electron clouds typically produce smaller signals on each separate anode, and hence neither may be large enough to be counted, thus leading to an error in the ion counting. There are a number of procedures that may be used to minimize the effect of shared signals. First, the MCP and the large anode may be positioned close to each other so that the electron cloud produced by one ion will not be able to disperse between the MCPs or between the MCP and the anode. Second, anodes with large area-to-circumference ratios (e.g., round anodes) may be used to minimize the effect of shared signals. Third, the anodes may be offset and a small anode may be placed behind a large anode so that the large anode acts as a mask. For example, as illustrated in FIG. 14, mask 49 may be used to restrict the ion fraction received by small anode 47. In FIGS. 6-10 and FIG. 13, large anode 46 is used as a mask in the same sense that mask 49 is used in FIG. 14.

Figure 15:
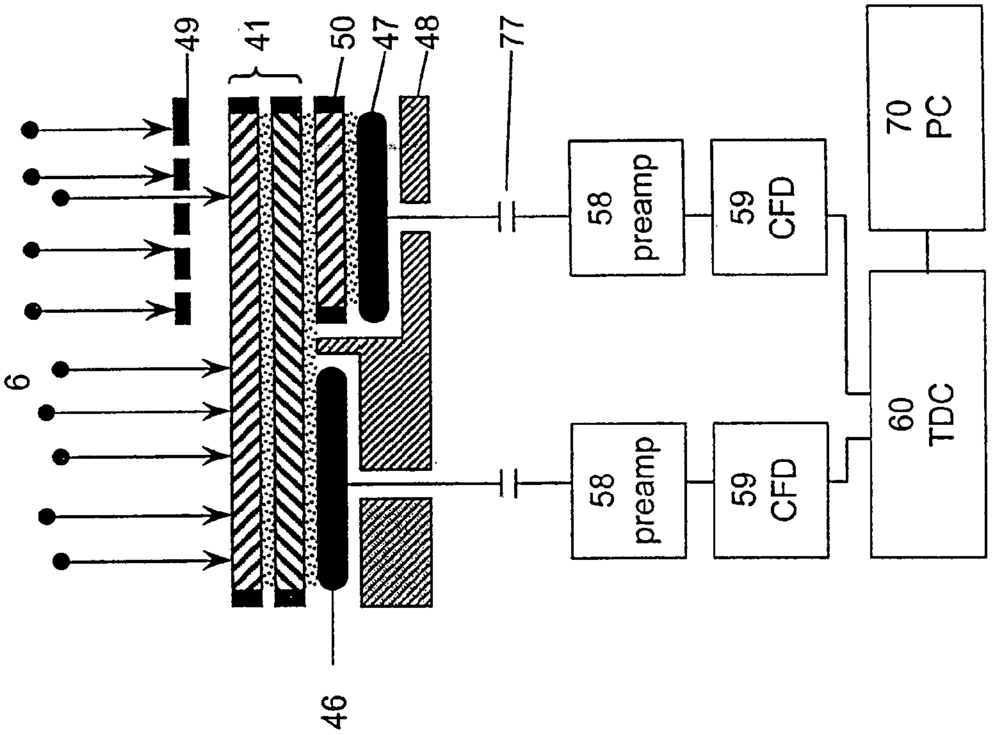
FIG. 15 is a schematic diagram showing a detector in which a mask in front of the first MCP restricts the ion fraction received by the small anode, and an additional multiplier stage 50 for the small anode is used to discriminate against crosstalk from the large anode.

FIG. 15 illustrates an embodiment of the present invention in which mask 49, which reduces the ion fraction of small anode 47, is positioned in front of electron multiplier 41. MCP 50 is the second stage multiplier for the small anode. The crosstalk from large anode 46 to small anode 47 is also minimized by shield 48. This embodiment of the detector is capacitively decoupled by capacitors 77. This decoupling allows the anodes to be floated to a high positive voltage while the electronics operate at or near ground potential.

Figure 16B:
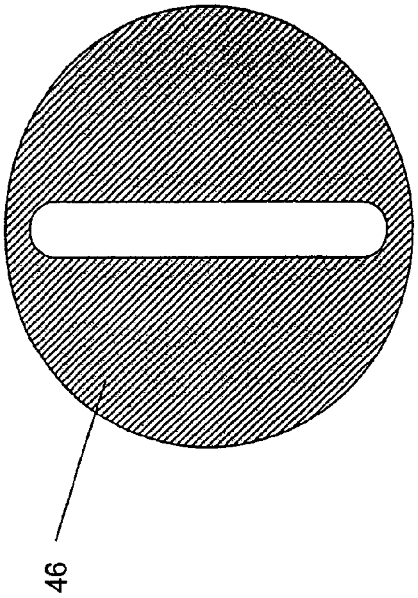
FIGS. 16B and 16C are top views of Anodes 46 and 47, respectively, in FIG. 16A.
Figure 16C:
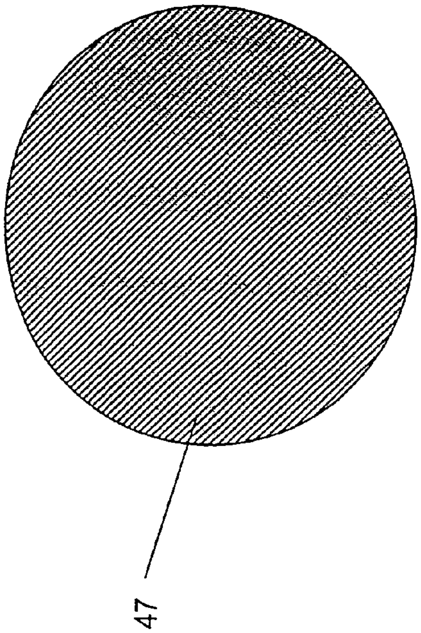
Figure 16A:
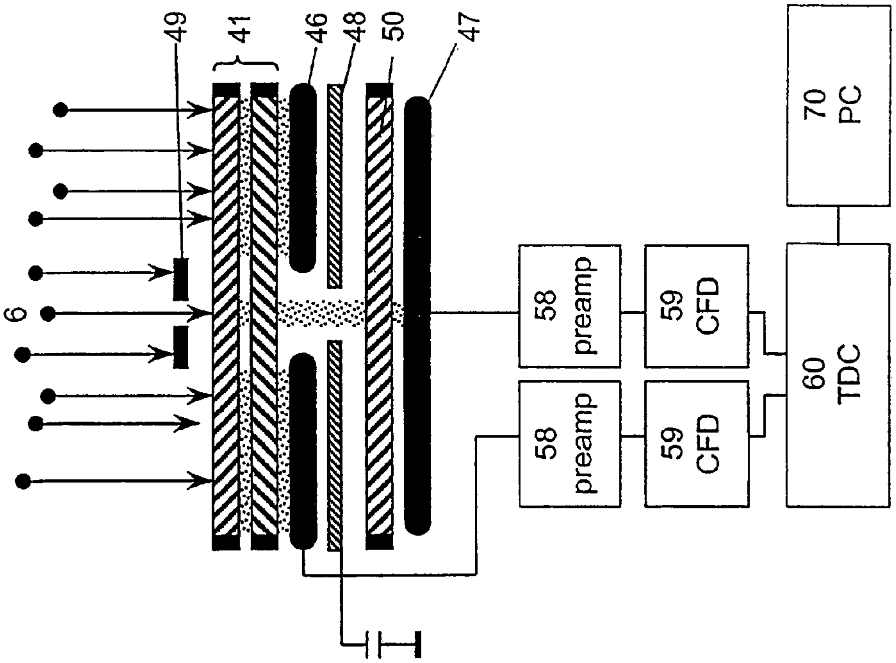
FIG. 16A is a schematic diagram showing a symmetrical embodiment of the detector presented in FIG. 15.

FIG. 16A illustrates an embodiment that is similar to that depicted in FIG. 15 yet with a more symmetrical design. Top views of Anodes 46 and 47 in FIG. 16A are presented in FIGS. 16B and 16C, respectively. Again, the small anode count rate is reduced by mask 49. Ions passing the mask towards the small anode are amplified with second stage multiplier 50. The crosstalk from the large anode to the small anode is also minimized by shield 48, which is shown with a capacitor between the shield and ground. This capacitor allows a high frequency ground path from shield 48 to ground. The anodes in this embodiment of the detector are not capacitively decoupled, but decoupling may be included if desired.

Figure 17B:
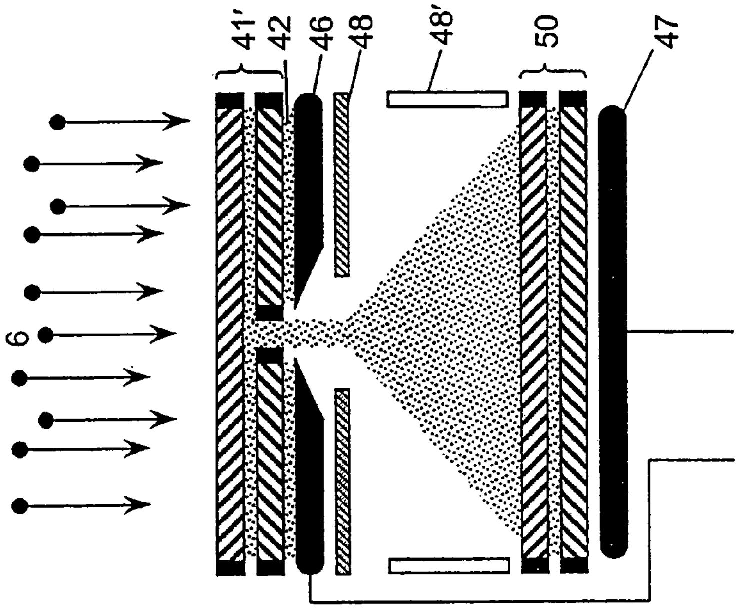
FIG. 17 is a schematic diagram of an embodiment of the present invention in which the inner rim of the second MCP is used as a mask to reduce the ion fraction received by the small anode.
Figure 17A:
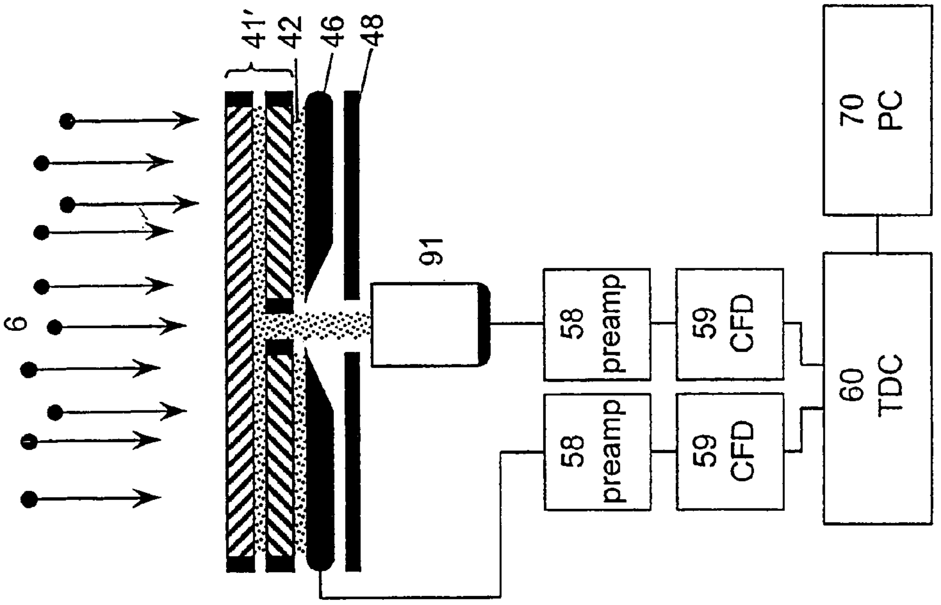

FIG. 17 illustrates an embodiment of the present invention in which a specially designed dual stack MCP 41' is used in which the second MCP has a hole in it. Holes may be cut into the second channel plate by laser machining. When an excimer laser is used for machining a hole into an MCP, then an area around the rim of the hole concentric with the hole and about 50 microns wide will become dead for the purposes of electron multiplication. The inner rim dead area of the second MCP is thus used as a mask. The combination of this inherent dead area and the shape of large anode 46 serves both to eliminate shared signals and to reduce the ion fraction received by the small anode. In this case, the small anode is incorporated into CEM 91. Any other electron multiplier may be used in place of CEM 91 so long as its multiplication factor is larger than the multiplication factor of the second MCP in first stage MCP stack 41. For example, CEM 91 may be replaced by a dual channel plate assembly as shown in FIG. 17B. FIG. 17B also illustrates the use of defocusing element 48 to spread the electrons passing through anode 46 onto MCP 50 with multiplication onto anode 47. Anode 47 and anode 46 have equal area in FIG. 17B.

Figures 18A, 18B, 18C:
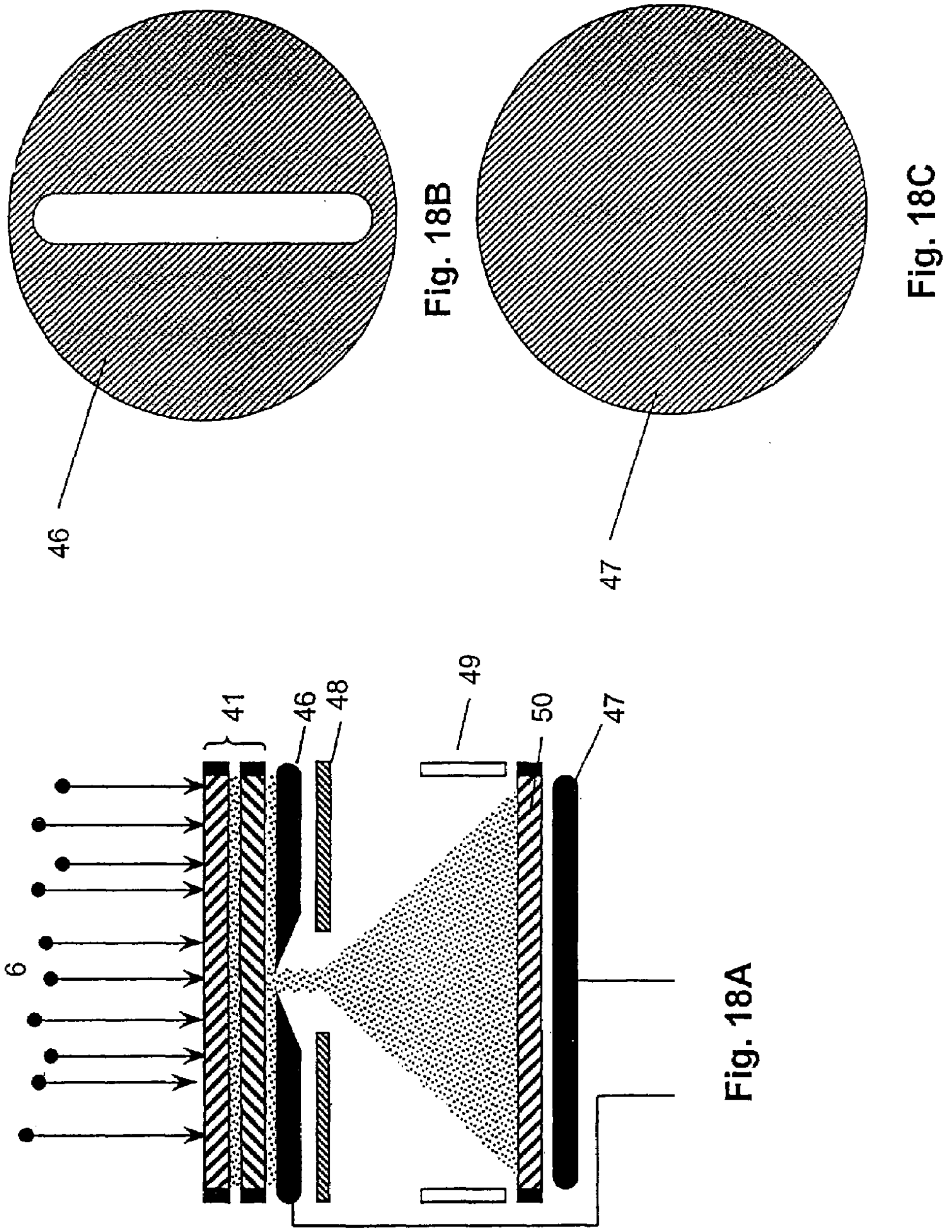
FIG. 18A is a schematic diagram of an embodiment of the present invention in which the secondary electrons are able to impinge anywhere upon the entire surface area of the collection anodes.
FIGS. 18B and 18C are top views of Anodes 46 and 47, respectively, in FIG. 18A.

FIG. 18A illustrates an embodiment in which the secondary electrons are able to impinge anywhere upon the entire surface area of Anodes 46 and 47. Top views of Anodes 46 and 47 in FIG. 18A are presented in FIGS. 18B and 18C, respectively. The location of the second multiplier stage and the deliberate spreading of the electron cloud onto the second equal area anode 47 thus permit measurement of the same number of secondary electrons as the unequal area anodes in the previously described embodiments and in FIG. 4 and FIG. 5. The spreading of the electrons onto the small fraction anode 47 anode is achieved by using electrodes 48 and 49 as defocusing electrostatic lenses. There are several advantages to this embodiment. The disadvantage of the crosstalk from the large to small anode combination of FIG. 4 has already been discussed, and the embodiment shown in FIG. 18A will solve this problem. In addition, however, there is yet another disadvantage to the approach in FIG. 4 that none of the embodiments described so far has overcome. This disadvantage comes from the non-proportional reduction in gain as a function of ion flux that occurs in the lower MCP of MCP pair 41. This gain reduction is not related to electronics, but comes from the inability of MCP stage 41 to generate electrons after the initial particle flux becomes too high. It is well known that as one continues to increase the particle 6 flux, eventually the number of secondary electrons produced in response to each particle 6 by MCP 41 will begin to be reduced and that the lower of the two plates is where the gain reduction occurs first. In the end, as the particle flux is still further increased, the number of secondary electrons falls below the minimum necessary for detection by CFD 59 so that no count is registered even though many particles are striking MCPs 41. It is also well known that this phenomena is caused by charge depletion in a micro-channel after a particle 6 has struck the channel and the channel has cascaded secondary electrons in response to this impact. Once this channel has "fired" in response to the particle impact, one must wait for anywhere from 100 microseconds up to a millisecond before it can again respond to an impact with an adequate production of secondary electrons. Furthermore, this charge depletion can actually affect nearest neighbor channels by drawing some of their charge as well, which thus also renders them less effective at producing secondary electrons in response to a subsequent particle impact. The third MCP 50 will allow efficient multiplication of the roughly $10^6$ secondary electrons that were produced by the previous multiplier stage 41. This will suppress crosstalk signals on the small anode 47. The combination of MCP 50, a defocusing lens element 48, and a voltage bias applied to lens 48 results in a defocused electron cloud onto MCP 50 in a manner similar to that in FIG. 17B. A second independently biasable electrode 48' is included to further spread the electron cloud onto MCP 50. Electrode 49 may also function as a secondary gain stage if it is constructed of an appropriate material such as CuBe and biased in such a way to attract the electrons to collide with this element. It also functions as a shield to prevent scattered electrons from spilling over the edge of MCP 50 and anode 47. The defocusing spreads the electron cloud over many more micro-channels on MCP 50 than would be the case if they were all concentrated into an area defined by the opening in anode 46 on MCP 50. Therefore, the tendency of the third MCP 50 to suffer gain reduction as a function of the number of particles 6 impinging the detector is reduced. Such a defocusing stage can also be implemented between the two MCPs of the first multiplication stage 41 or the lower of the two MCP 41 plates can be replaced by some other type of higher gain electron multiplier. Alternatively, a defocusing lens between the MCPs in MCP pair 41 will allow for using a larger second MCP, which then will allow for higher ion flux.

Figure 18E:
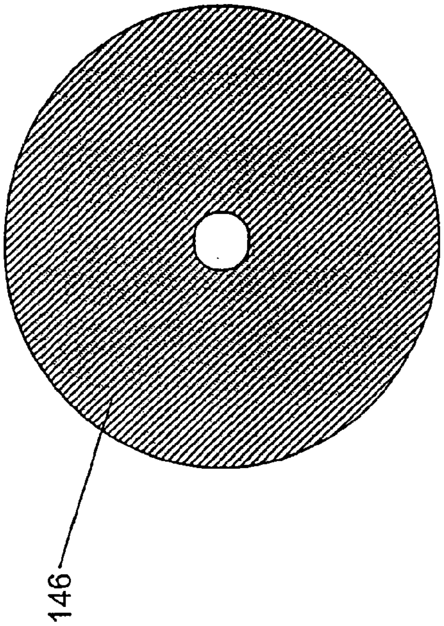
FIGS. 18E and 18F are top views of Anodes 146 and 147, respectively, in FIG. 18D.
Figure 18F:
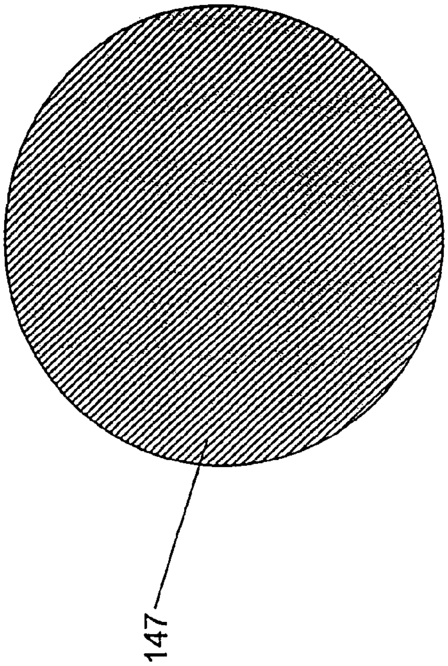
Figure 18D:
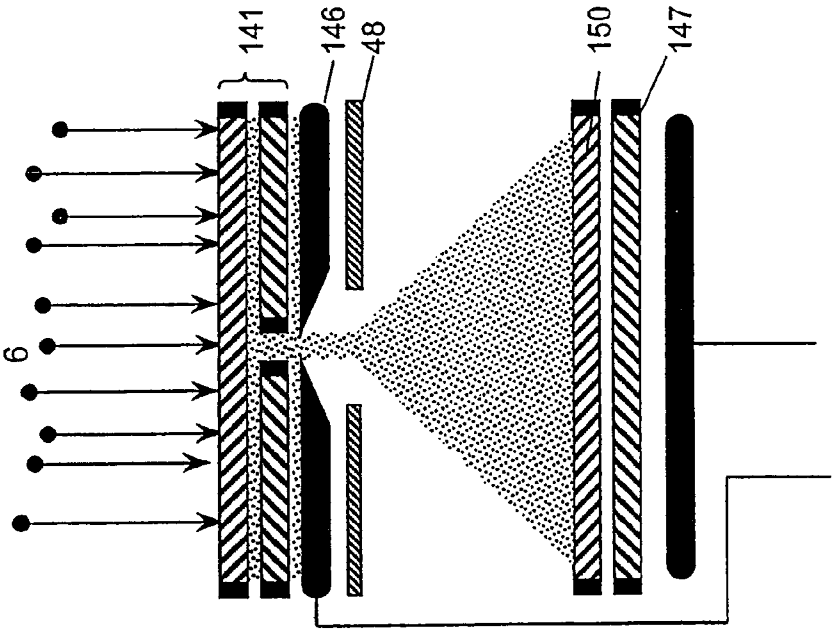
FIG. 18D is a schematic diagram of another embodiment of the present invention in which the secondary electrons are able to impinge anywhere upon the entire surface area of the collection anodes.

The embodiment in FIG. 18D makes use of a hole in the second MCP plate with subsequent spreading of the electron cloud passing through this hole by biasing optical element 48 so that the electrons spread onto an equal area MCP 150. This configuration provides the maximum dynamic count range possible from a collection of channel plates. It is well known that at high count rates the second channel plate in the stack begins to charge deplete before the top plate. In the first plate, between one and four channels are activated when an ion hits. The subsequent amplified electron cloud that exits the first plate will spread over multiple channels in the second plate even if the two plates are in close proximity or are touching. Therefore, many more channels will deplete in the second plate than in the first plate in response to an ion event. Transporting and spreading the electrons onto the second MCP stack 150, which is acting as the multiplier for the small signal, results in a larger amplitude electrical signal on anode 147 in response to the restricted ion signal than will be generated by the dual stack MCP amplifier in front of anode 146 even for multiple simultaneous ion events. With this embodiment, the ion flux may become high enough to charge deplete the second channel plate of the stack in front of anode 146 so that anode 146 eventually no longer records any ion hits. Nevertheless, the first plate will produce enough electrons so that the small stack will still respond. The hole size of anode 146 and the second MCP plate may be selected so that the small anode signal will remain linear even though the signal generated by the first plates onto anode 146 are no longer large enough to exceed the threshold of the discriminator and thus be counted. FIGS. 18E shows anode 146 with a small hole rather than the slit of FIG. 18B Alternatively, an arrangement of rectangular slices of channel plate would eliminate the need to laser machine the second multi-channel plate if a configuration similar to FIG. 17B were desired. Note that the electrical signal from the small fraction anode 147 has the same or even a larger size than the large fraction anode 146. The ion flux can be further increased by monitoring the count rate on each anode 146 and 147 for each detected mass peak, and determining which ones are of acceptable intensity and which are overly intense. At that point, after each extraction cycle, a voltage pulse of a few hundred volts can be applied through capacitive coupling to the MCP 141 stage to momentarily reduce its bias voltage (thus lowering its gain) for a few nanoseconds precisely at the times of arrival of the overly intense peaks at the MCP, thus reducing the gain during the arrival of intense peaks and ensuring that charge depletion in the MCP does not occur. This allows the entire detector response to subsequently remain linear for other less intense ions. The intensity of the intense peak can usually be inferred by use of peaks comprised of lower abundance isotopes. The same reduction could be obtained if the plates of MCP 141 were biased separately with a pulse being applied to either plate.

Figure 18H:
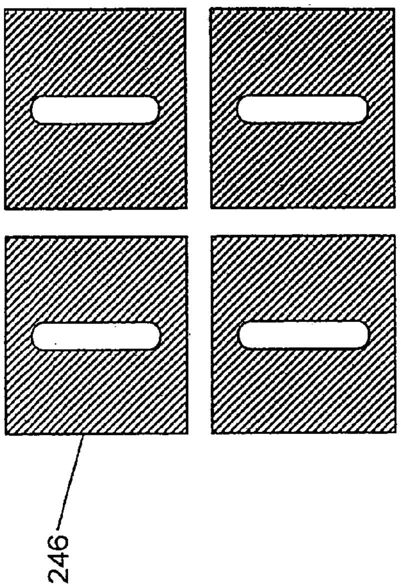
FIGS. 18G is a schematic diagram of an array constructed using sub-units as shown, for example, in FIGS. 18A and 18D.
Figure 18I:
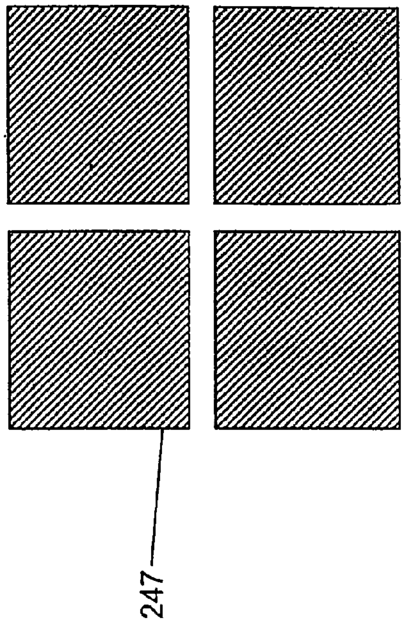
Figure 18G:
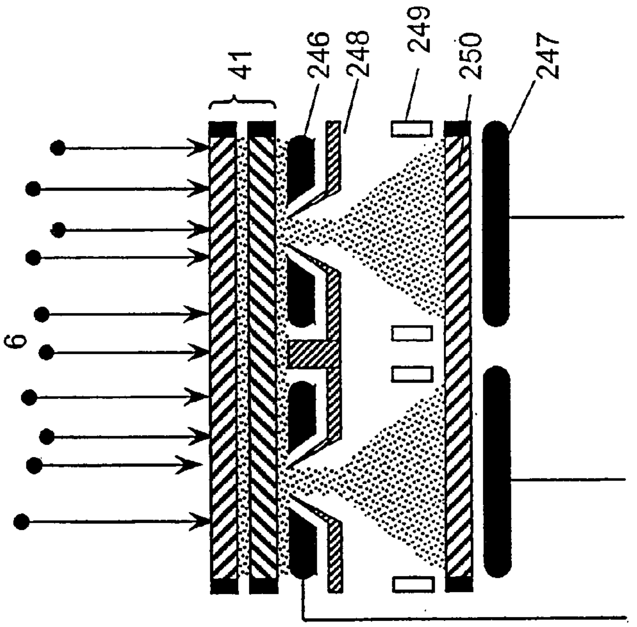

The embodiment in FIG. 18G is particularly useful for high count rate applications and is a combination, with modifications, of the embodiments shown in FIG. 17 and FIG. 18A. FIG. 18G shows an embodiment in which the concept of FIG. 18A is extended to an array structure. These are illustrated as four sub-units behind a rectangular MCP. It is clear that any number of these structures may be arranged either in linear fashion or in an array behind MCP 41 so that the position of impact of particles 6 on MCP 41 can be determined. Note that in FIG. 18G a different embodiment of cross talk shield 248 is illustrated. Shield 248 can be at a potential that is repulsive to the electrons coming from first stage multiplier 41, hence forcing all electrons originating from one ion onto either of large anodes 246, or through the opening in shield 248 towards second stage multiplier 250. Electrode 249 may also function as a secondary gain stage if it is constructed of an appropriate material such as CuBe and biased in such a way to attract the electrons to collide with this element. It also functions as a shield to prevent scattered electrons from spilling over the edge of MCP 250 and anode 247. This embodiment minimizes "signal sharing," which is the dividing of the electron cloud originating from one single ion between different anodes. Anode 249 can be used to further disperse the electrons above anode 247. FIGS. 18H and 18I show top views of anode arrays 246 and 247, respectively.

Figure 19B:
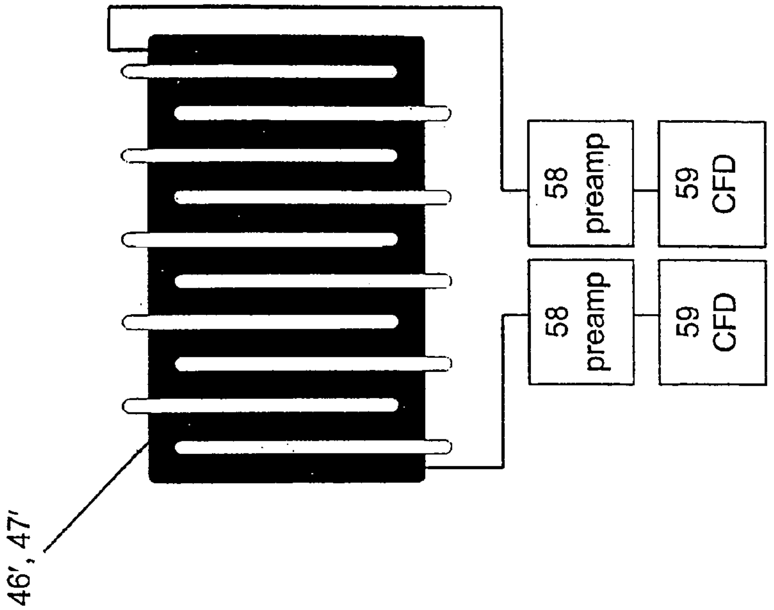
FIGS. 19A and 19B show the application of the unequal anode principle to a position sensitive detector (PSD).
Figure 19A:
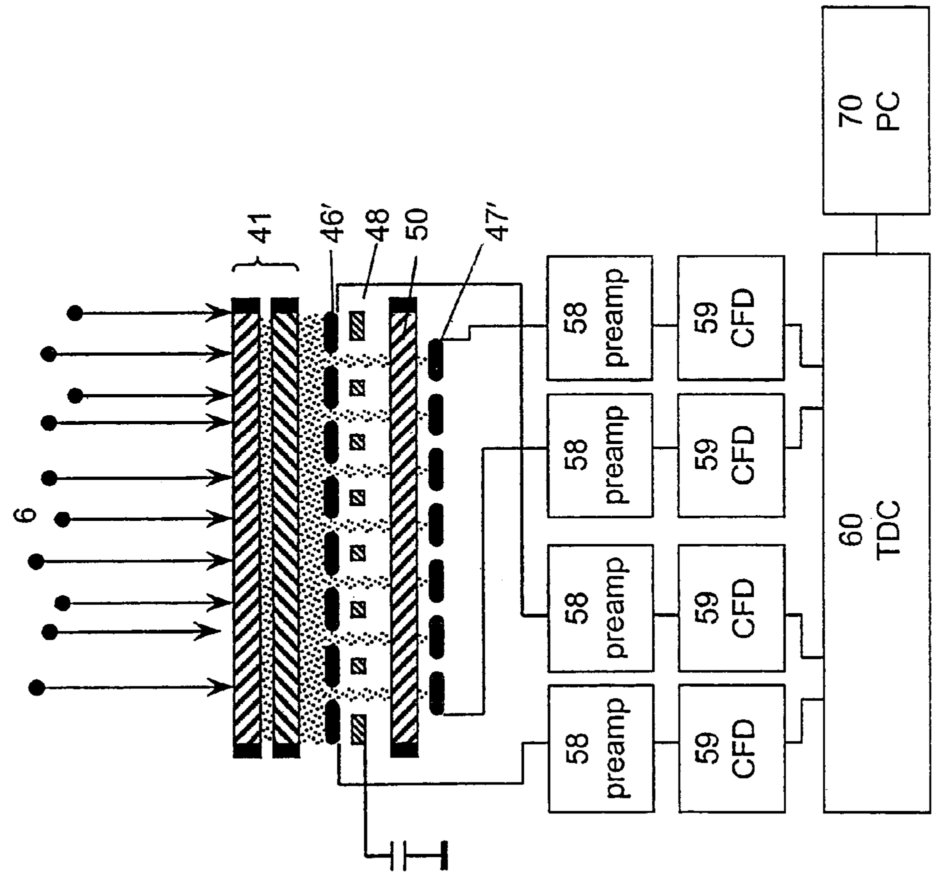

FIG. 19 illustrates the application of the unequal area detector to Position Sensitive Detectors (PSDs). PSDs often have particularly long dead times and hence limited dynamic ranges. This makes the application of the unequal anode principle especially attractive. As in the case of the detectors discussed previously, large anode 46' detects a large portion of incoming particles 6. At least one additional anode 47' detects a smaller fraction of incoming particles 6 and therefore has a decreased prospect for suffering from dead time effects. Again, an additional electron multiplication stage may be used to increase the signals of real ion events compared to signals from inductive crosstalk. In FIG. 19A, MCP 50 is used for this additional multiplication stage. Note again that "small" meander anode 47' does not necessarily have to be smaller in size than large anode 46', and in fact anode 48 may be biased to spread the electron cloud in an analogous manner to that shown in FIG. 18A. Small meander 47' only has to detect a smaller fraction of the incoming particles 6. Hence, it is possible to use two identical anode designs, where large anode 46' masks the small anode, which means that it restricts the fraction of particle signals that are received by small anode 47'. Preferably, the two anodes are offset from each other so that small anode 47' efficiently detects the particle signals that pass through the gaps of large anode 46'. Additionally, cross talk shield 48 may be used in order to minimize crosstalk and to defocus the electron cloud as desired. This is especially useful if second stage MCP 50 is omitted. FIG. 19B illustrates a top view of large meander anode 46', which, as mentioned before, preferably has a similar shape as small anode 47'. The PSD detects the particle position along one dimension that is orthogonal to meander legs. It does so because the electron cloud divides and flows to both ends, and by evaluating the time difference of the signal on both ends of the meander anode one can measure where the electron cloud hit. As indicated in FIG. 19A, two distinct TDC channels on each meander are used to measure this time difference.

Figure 20B:
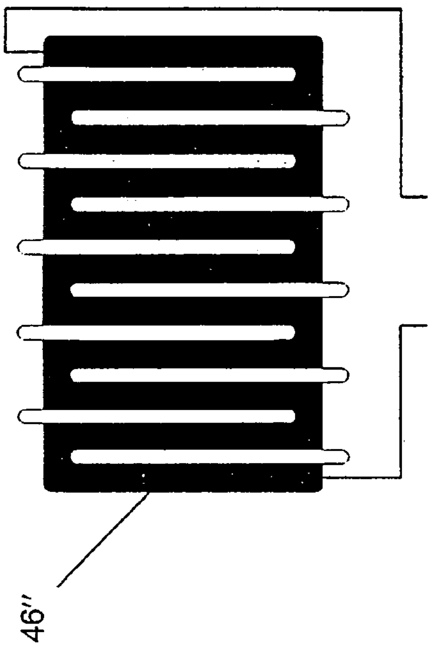
FIG. 20A shows a combination of a multi-anode detector and a meander anode. Here, large anode 46" consists of a meander anode (FIG. 20B) and small anodes 47" consist of a multi-anode array as shown in FIG. 20C.
FIG. 20D shows a combination of multi-anode detector and meander anode in which the positions of the meander and multi-anode structures are interchanged from the orientation shown in FIG. 20A so that the large anode comprises the multi-anode 47'" and small anode is meander 46'".
Figure 20C:
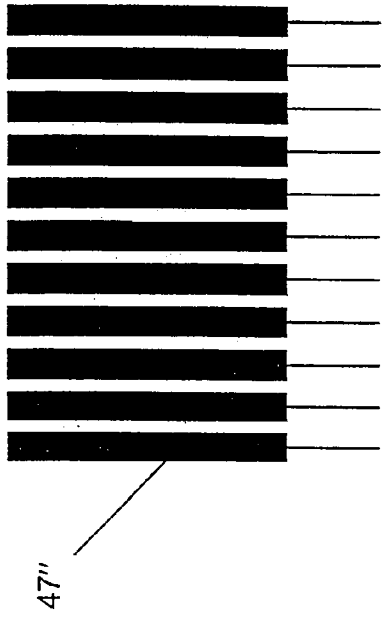
Figure 20A:
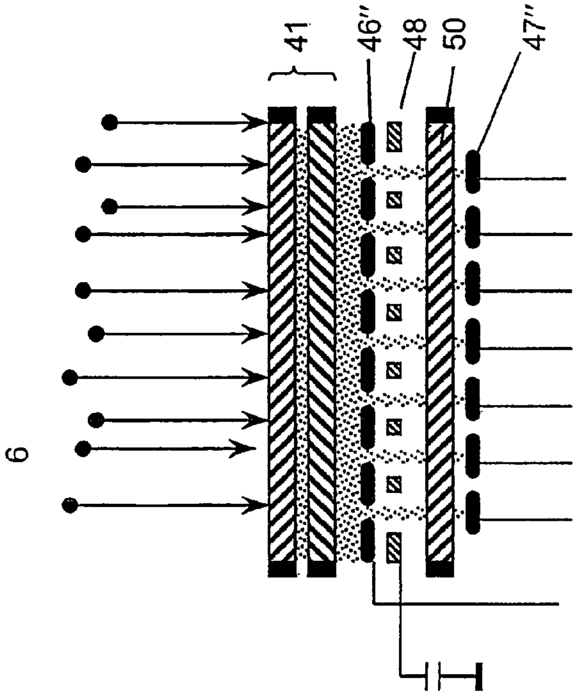
Figure 20E:
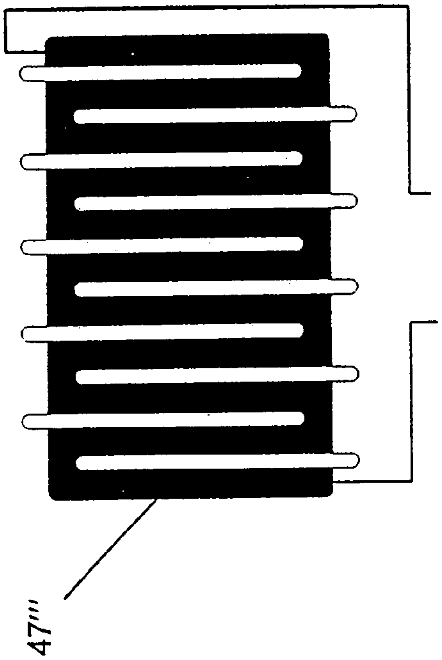
Figure 20F:
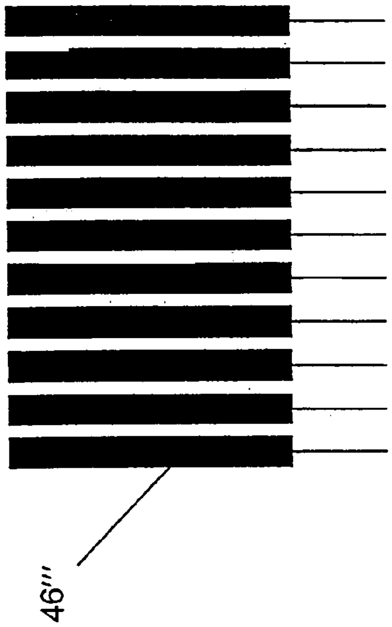
Figure 20D:
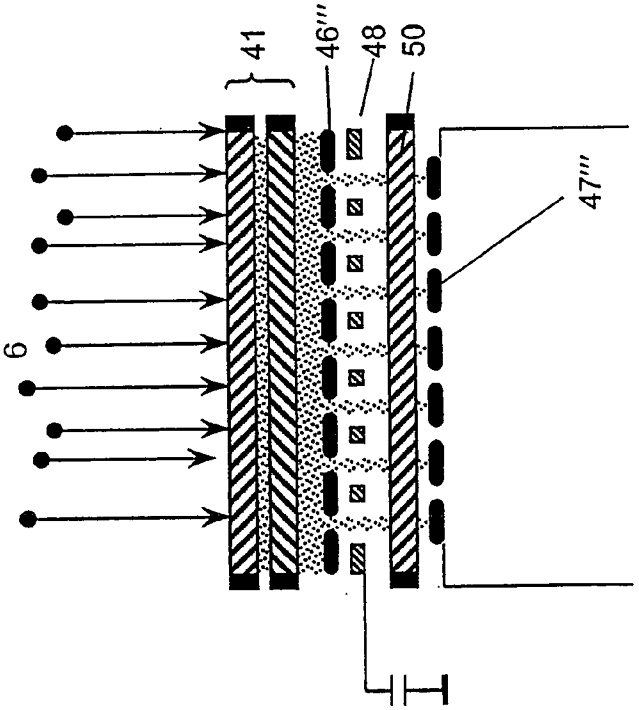

FIG. 20A further extends the concept to include a hybrid combination of discrete anodes 47" (FIG. 20C) with meander 46" (FIG. 20B) to monitor the small yield ions. This reduces by nearly one half the number of discrete channels of electronics necessary to run a multi-anode detector with an increased dynamic range. Instead of having discrete electronics for discrete anodes 47", only two channels are required to encode the position by measuring the time difference of signals arriving at each end of the meander. Note that instead of the embodiment shown in FIG. 20A, the positions of anode 47" (discrete anodes) could be interchanged with meander anode 46". The resulting embodiment would be particularly useful in high count rate applications.

Figure 3:
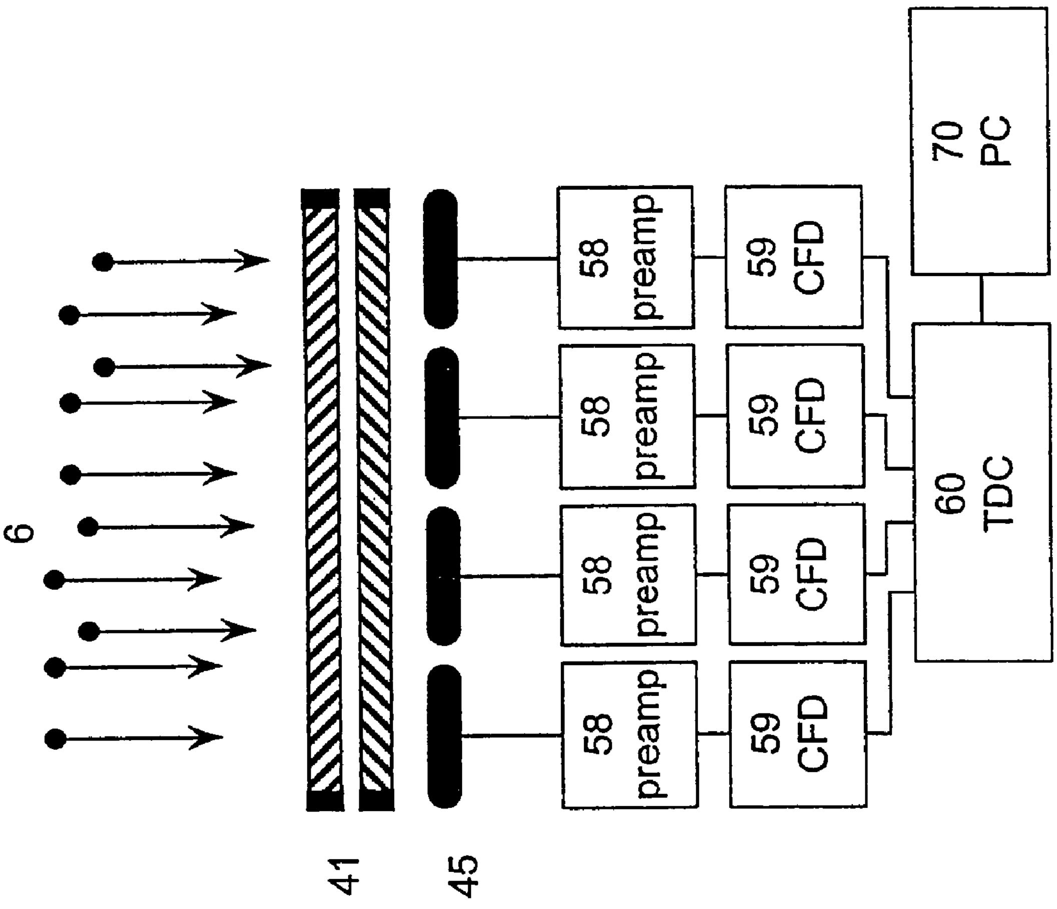
Fig. 3 Prior Art
FIG. 3 is a schematic diagram showing a multiple anode detector from the prior art.
Figure 21B:
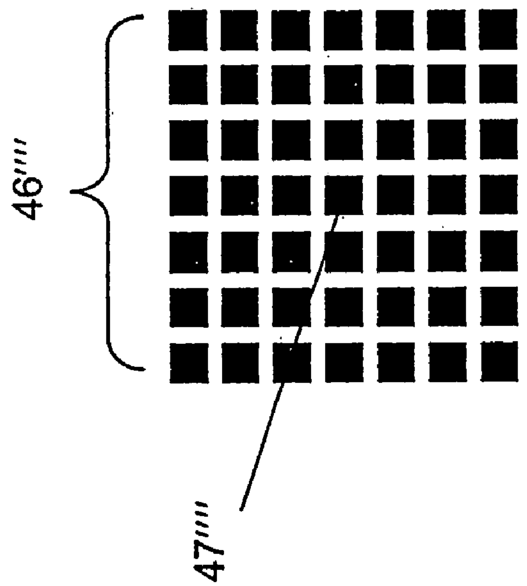
FIG. 21A shows a hybrid detector consisting of a first multiplication stage using a MCP 41 and a second multiplication stage using another type of detector such as discrete dynode copper beryllium multiplier 94. Discrete dynode multipliers are commercially available, and they may contain a multi-anode array of signal outlets as illustrated in FIG. 21B. It is possible to make an unequal anode detector from such a discrete dynode detector by combining certain of these outlets to produce large anode 46"" and using a single outlet (or a reduced number of outlets) as small anode 47"".
Figure 21A:
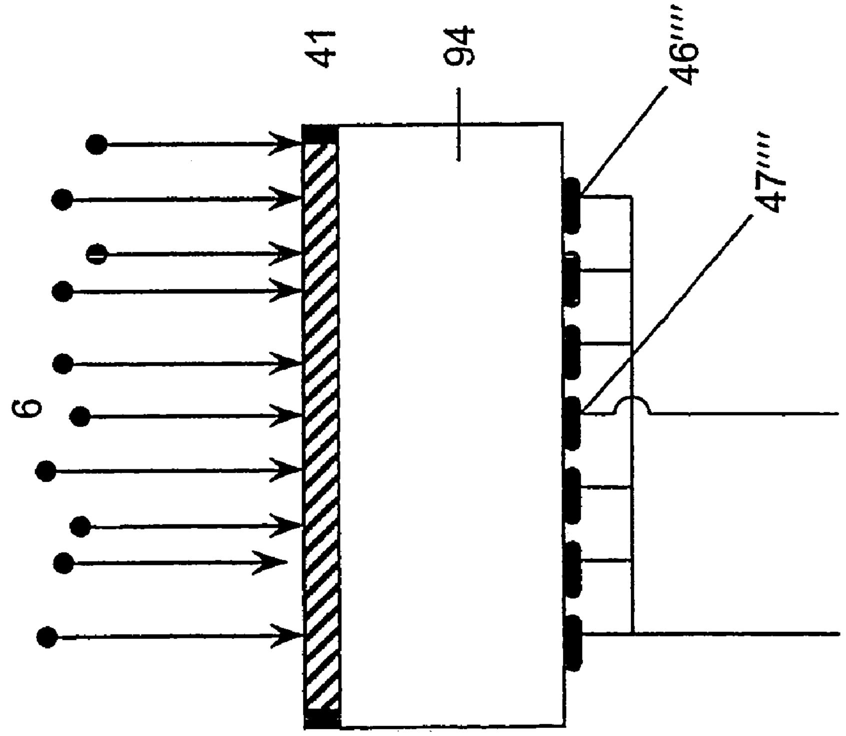

FIG. 21A illustrates the use of a discrete dynode detector such as a commercial copper beryllium detector as a TOF detector. Copper beryllium detectors have very high count rate capabilities and hence are useful for reducing saturation effects caused by charge depletion. Those detectors also typically have an array of signal outlets, which allows for some position detection. Combining several of those outlets into one TDC channel allows construction of large anode 46'". A single outlet or a combination of a reduced number of outlets will produce small anode 47'" (FIG. 21B). This allows exploiting the full dynamic range capability of such a detector even with a small number of TDC channels. Preferably, such a detector uses MCP 41 to convert the incoming ions 6 into electrons, which will minimize the time errors cause by flight path differences of ions impinging onto the entry surface of a copper beryllium detector 94. If a TDC channel is connected to each of the 49 anodes, then the resulting configuration is similar to that in FIG. 3. However, it is possible to use the configuration as a two channel device by electronically designating one of the 49 electrodes as the small anode and then electronically "ORing" the remaining 48 anodes within TDC 60 or PC 70. Thus, two separate histograms may be maintained, each subdivided by an equal number of minimum time intervals. One histogram is incremented by one whenever the small anode is hit and the other is incremented by one when at least one of the other 48 anodes is hit. In this way, in high count rate applications, the amount of data that must be processed is reduced. This embodiment has the advantage that one configuration of the multi-anode detector hardware can be used for both high data rate applications when the application of small/large anode statistics are valid, while at the same time retaining the capability to capture each and every ion in applications where the total amount of ion signal is small. For example, when using gas samples with the mass spectrometer, time averaging abundant ion signals over many extractions using one equally sized anode for the "small" anode and any one of the other equally sized anodes for the "large" anode is statistically possible, whereas in a MALDI (Matrix Assisted Laser Desorption and Ionization) application the number of laser shots may be less than 100 and, because of limited sample size or ionization efficiency, the number of ions desorbed in each shot may be, for example, less than 10. In this MALDI case, the internal "ORing" would be removed and each anode would be used to count and assign an arrival time to each ion.

The embodiments shown in FIGS. 19, 20, and 21 can be particularly useful where both time and position information is desired. One use for these embodiments is to correct for timing errors caused by mechanical misalignments or electric field inhomogeneities in the time-of-flight mass spectrometer shown in FIG. 1. The time-of-flight t of an ion of mass M from extraction chamber 20 to the face of detector 41 is given simply by $t=k\sqrt{M}$. By using any of the embodiments shown in FIGS. 18G, 19A, and 20A, in combination with test ions of known molecular weight, it is possible to determine spectrometer constants for each separate anode 46 and 47 in FIG. 19, for example. Once the spectrometer constant has been determined for each anode, then it is possible to store these values in PC 70 or in TDC 60 so that the arrival times of flight at each anode can be corrected to yield the true mass.

Another useful feature of the embodiments in FIGS. 19, 20, and 21, when used with the orthogonal time of flight spectrometer in FIG. 1, comes from the fact that the extent to which extraction chamber 20 is filled will depend on the mass of the ion. All ions are accelerated to the same energy so that light ions will travel far into extraction chamber 20 compared to heavier ions. Thus, ions hitting detector 40 are distributed non-uniformly across the detector as a function of ion mass. With arrays of anodes or position detectors this effect can be easily accommodated by anode positioning so that small anodes are always irradiated irrespective of mass. However, recognizing this mass dependence on the impact position onto anode 40 will require that if, for example, the detector in FIG. 18A is substituted for anode 40 in FIG. 1, then the detector of FIG. 18A will need to be mounted so that the long axis of the anode in FIG. 18B is parallel with the direction of ion motion within extraction chamber 20. Note that if the anode in FIG. 18B is orthogonal to the ion direction, then ions of too low a mass will not be sampled efficiently—or possibly not at all—by the anode in FIG. 18C.

In addition to the saturation effects described above, it is understood that the present invention may be used to overcome other dead time effects (such as a centroid shift, dynamic range restriction) known to those of skill in the art. In particular, with regard to both counts loss and centroid shifts, statistical methods may be used to further overcome saturation effects by reconstructing the original particle flux.

Combining the TDC Recordings of Different Anodes of an Unequal Anode Detector This section describes a method for combining the TDC recordings received by different anodes in an unequal anode detector.

A. TDC Dead Time Correction for Isolated Bins or Isolated Mass Peaks.

An important property of TDC data recording is that, for each TOF start, it records for a given time bin only two events: (1) "zero," which indicates the absence of particles, and (2) "one," which indicates that one or more particles have impinged on the anode. An initial flow of particles may have a Poisson distribution denoted by $$p_k = \frac{\lambda^k}{k!}e^{-\lambda},$$

where $p_k$ denotes the probability that k particles are detected on the anode within a certain time span if the average number of detected particles in that time span is λ. The event "zero" corresponds to k=0, and hence occurs with probability $p_0=e^{-\lambda}$, whereas the event "one" has probability $p_1+p_2+p_3+\ldots=1-p_0=1-e^{-\lambda}$. For a known number of TOF extractions, $N_x$, and recorded number of counts, $N_R$, it follows that:

$$1-e^{-\lambda} \approx \frac{N_R}{N_x},$$

which implies that:

$$\lambda \approx -\ln\left(1-\frac{N_R}{N_x}\right).$$

From the estimate for λ, the total number of particles impinging on the anode during $N_x$ extractions can be derived as:

$$\tilde{N}_R = \lambda \cdot N_x = -N_x \ln\left(1-\frac{N_R}{N_x}\right). \tag{1}$$

Equation (1) hence provides a method to correct for dead time effects in a TDC measurement. It reproduces the number of impinging particles $\tilde{N}_R$ when $N_R$ events were recorded in $N_x$ extractions.

An estimate for the variance of $\tilde{N}_R$ is given by:

$$\sigma^2\tilde{N}_R \approx \frac{\sigma^2 N_R}{(1-N_R/N_x)^2}.$$

The value $N_R$ has a binomial distribution because it is the result of $N_x$ independent trials that have the possible outcomes "zero" and "one." Thus, its variance is:

$$\sigma^2 N_R = N_x(1-e^{-\lambda})e^{-\lambda} \approx N_R(1-N_R/N_x). \tag{2}$$

From this expression for the variance of $N_R$, one obtains the following expression for the variance of the estimated quantity $\tilde{N}_R$:

$$\sigma^2\tilde{N}_R \approx \frac{N_R}{(1-N_R/N_x)}. \tag{3}$$

These results are valid not only for isolated spectrum bins, but they are valid whenever the time span under consideration does not inherit any dead time from previous events. In practice, this means that all previous bins extending over a time range equal to the dead time must have very low count rates. If this is not the case, an additional correction explained in the next section may be applied.

As mentioned above, these results are also valid when applied to entire peaks that (1) have a width smaller than the dead time of the recording system, so that for each peak not more than one particle is recorded per extraction (i.e., trial), and (2) do not inherit dead time from previous peaks. These conditions are often fulfilled in TOF mass spectrometry since typical dead times of current TDCs are in the range of τ=20 ns, whereas for gaseous analysis, for example, typical peak widths are in the range of 2 ns and the distance between peaks is often more than 100 ns.

B. TDC Dead Time Correction for Non-Isolated Bins or Non-Isolated Peaks.

Suppose that the dead time of the data recording system τ is known and that this system is working in a "blocking mode" in which a particle falling into a dead time does not re-trigger the dead time but instead is fully ignored. Then, the $k^{th}$ bin may include dead time effects from particles recorded in preceding bins. Assuming a bin width $\tau_b$, there are about $m=\tau/\tau_b$ previous bins that may contain such events. Whenever such an event occurred, there was no way that the $k^{th}$ bin could have recorded a particle. This in effect is equivalent to stating that the $k^{th}$ bin has experienced a decreased number of extractions (i.e., trials). This decreased effective number of extractions can be expressed as:

$$N_x'(k) \approx N_x - \sum_{j=1}^{round(m)} N_R(k-j).$$

A more precise result that considers the fact that m is not an integer, is:

$$N_x'(k) = N_x - \sum_{j=1}^{j\le\tau/\tau_b-1} N_R(k-j) - (\delta + 0.5 - 0.5\delta^2)N_R(k-j_0) - 0.5\delta^2 N_R(k-j_0-1), \tag{4}$$

where $j_0=[\tau/\tau_b]$ is the integer portion of the number in the square brackets and $\delta=\tau/\tau_b-j_0$. This value for the effective number of extractions may then be substituted into Equation (1) to obtain:

$$\tilde{N}_R = \lambda \cdot N_x = -N_x \ln\left(1 - \frac{N_R}{N_x'}\right). \tag{5}$$

Additional information regarding these estimates may be found in T. Stephan, J. Zehnpfenning, and A. Benninghoven, "Correction of dead time effects in time-of-flight mass spectrometry," *J. Vac. Sci. Technol.* A 12(2), March/April 1994, pp. 405-410, which is incorporated herein by reference. The corresponding (conditional) variance is:

$$\sigma^2\tilde{N}_R = \frac{N_R N_x^2}{(1 - N_R/N_x')(N_x')^2}. \tag{6}$$

Equation (6) provides an estimate of the variance for the reconstructed number of ions when the value $N_x'$ is known precisely. In practice, $N_x'$ will not be known precisely primarily because the dead time τ is not known precisely. A more precise estimate of the variance of $\tilde{N}_R$ may be obtained by considering the variance of $N_x'$ and covariance of $N_R$ and $N_x'$:

$$\sigma^2\tilde{N}_R = \frac{N_R N_x^2}{(1 - N_R/N_x')(N_x')^2} + \frac{N_R^2 N_x^2 \sigma^2 N_x'}{(1 - N_R/N_x')^2 (N_x')^4} + 2\frac{N_R N_x^2 \operatorname{cov}(N_x', N_R)}{(1 - N_R/N_x')^2 (N_x')^3}. \tag{7}$$

The value of $\sigma^2 N_x'$ depends primarily on the uncertainty Δτ of the dead time τ, which is determined by the acquisition electronics in most cases. It has been found that such uncertainties, caused by electronics in the data acquisition system, is rather large. Depending on the specific electronic components in use, it is possible to find an estimate for $\sigma^2 N_x'$. For example, one can estimate $\sigma^2 N_x'$ by increasing and decreasing the dead time τ in Eq. (4) by Δτ and monitoring how $N_x'$ changes. The square of the total change is then an estimate for $\sigma^2 N_x'$. The third term, which includes $\operatorname{cov}(N_x', N_R)$, becomes zero if there is no correlation between $N_x'$ and $N_R$.

C. Method to Combine the Recordings of the Anodes of an Unequal Anode Detector.

The results of the previous section are also valid when the data is recorded using several anodes, each receiving different fractions of the incoming particles, since all anodes independently experience a Poisson particle inflow. The following discussion considers the case of two unequal anodes, where the so-called "big anode" receives a larger fraction of the incoming particles: $\tilde{N}_{RB}=a\cdot\tilde{N}_{RS}$. The coefficient a may be experimentally determined (for example, by recording at low particle fluxes where dead time effects are not present), and hence:

$$a = \frac{\tilde{N}_{RB}}{\tilde{N}_{RS}} \approx \frac{N_{RB}}{N_{RS}}. \tag{8}$$

Also, in the case where the anode fraction turns out to be different for different mass peaks, α can be determined for every individual peak. Similarly, a may depend on the total ion flux and hence may have to be recalibrated periodically.

After the anode fraction a has been determined, an estimate of the ion count rate can be derived. With increasing ion flux, the large anode experiences an increasing saturation effect, which results in a decreasing accuracy of the count rate determined on the large anode as shown by Equation (2). This accuracy may be improved, however, by taking into account the less saturated measurement of the small anode. In order to optimize the accuracy, it is necessary to find the linear combination, $$\tilde{N}=\alpha\tilde{N}_{RB}+\beta a\tilde{N}_{RS}, \tag{9}$$

of the two anodes that has minimal variance under the constraint α+β=1. This constrained minimization yields:

$$\alpha = \frac{a^2\sigma^2\tilde{N}_{RS}}{a^2\sigma^2\tilde{N}_{RS} + \sigma^2\tilde{N}_{RB}} \text{ and } \beta = \frac{\sigma^2\tilde{N}_{RB}}{a^2\sigma^2\tilde{N}_{RS} + \sigma^2\tilde{N}_{RB}}, \tag{10}$$

where the required variances are given by Equation (3), (6), or (7) in order to substitute $N_{RS}$ and $N_{RB}$, which are the recorded counts for small and big anode, respectively. The variance of this optimal linear combination $\tilde{N}$ is:

$$\sigma^2\tilde{N} = \frac{a^2\sigma^2\tilde{N}_{RS}\sigma^2\tilde{N}_{RB}}{a^2\sigma^2\tilde{N}_{RS} + \sigma^2\tilde{N}_{RB}}. \tag{11}$$

Hence, Equation (6) indicates how to optimally combine the recordings of the two anodes after the recorded count rates have been statistically corrected by Equation (1) or (3). The anodes of an unequal anode detector with more than two anodes can be combined accordingly.

Figure 22:
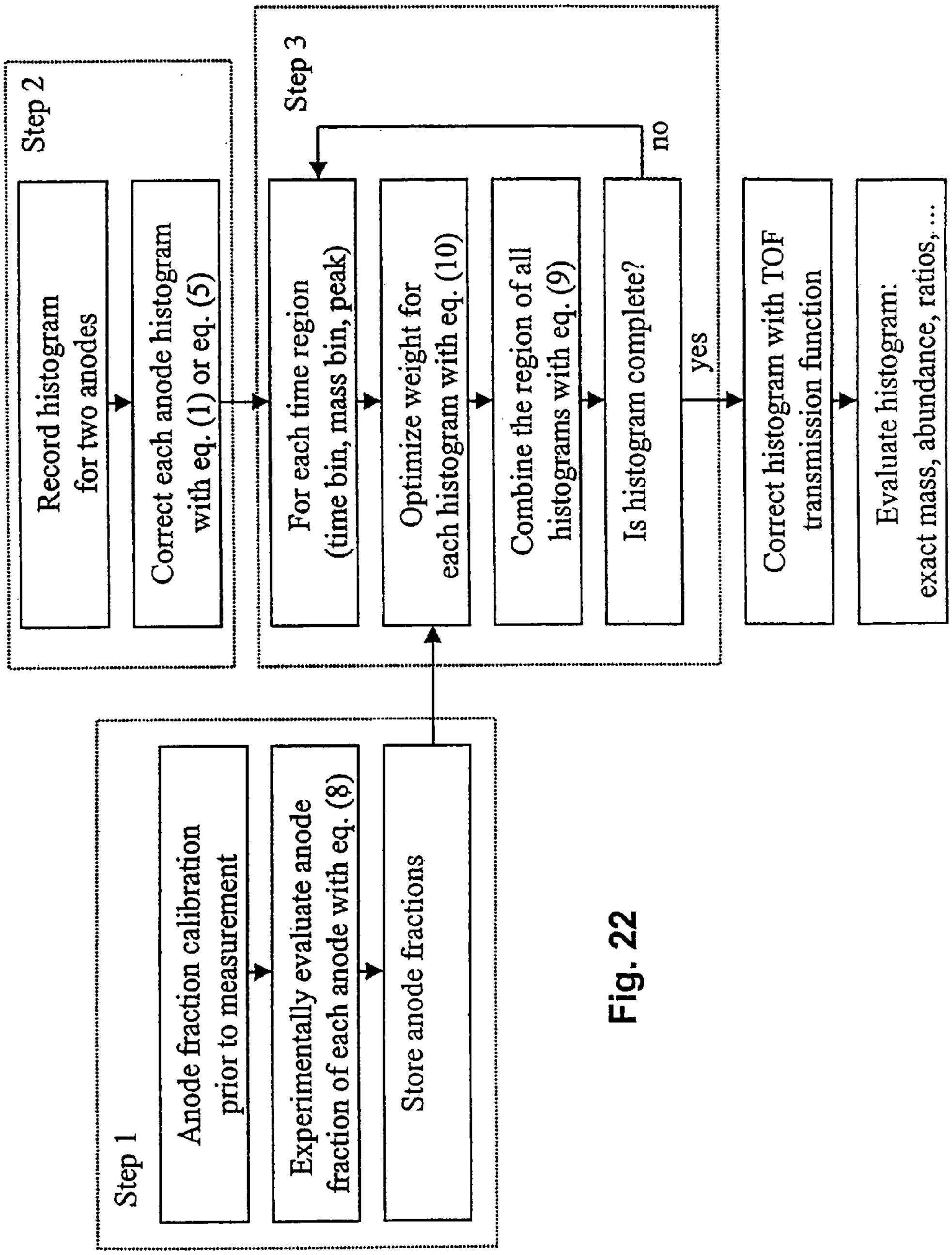
FIG. 22 is a flow chart showing a procedure to combine the information acquired by two or more unequal anodes into one combined spectrum.

Thus, the recorded histograms of an unequal anode detector may be combined using the following procedure, which is illustrated in FIG. 22:

Step 1: Evaluate anode ratio a if it is unknown.

Step 2: Independently record the histogram of both anodes and correct those histograms according to Equation (1) or (5), whichever applies.

Step 3: Combine the two histograms by applying Equation (9) for each bin or each peak, using the proper weights α and β derived with Equation (10).

A slightly modified procedure is preferred if the peak shapes on the different anodes are not sufficiently equal:

Step 1: Evaluate anode ratio a if it is unknown.

Step 2: Independently record the histogram of both anodes and correct those histograms according to Equation (1) or (5), whichever applies.

Step 3: Evaluate the desired properties (e.g., peak area, centroid position) and their variances from each corrected spectrum.

Step 4: Combine the desired properties by applying Equation (9) for each peak, using the proper weights $\alpha$ and $\beta$ derived by minimizing the variance, e.g., with Equation (10).

Note that for this second procedure, the ratio a may be adjusted for each property, e.g., each mass peak may have its own ratio a.

The statistical correction outlined above has been discussed in the context of evaluating the number of counts in peaks or bins only. A similar method may be used for the evaluation of the peak position or other properties to be evaluated from the spectrum. For example, an exact mass determination of an ion species requires the exact determination of its peak position in either the TOF histogram or the mass histogram. Either the peak centroid $\bar{t},\bar{m}$ or the peak maximum $t_{max},m_{max}$ are often used to represent the position of a peak. Both properties are subject to shifts in the case of saturation. Hence, for saturated regions of the large anode histogram, it may be better to rely more heavily on the small anode histogram for the evaluation of the peak position. Therefore, by replacing the count rate N by either $\bar{t},\bar{m}$ or $t_{max},m_{max}$ the method presented above may be used to obtain an estimate of the peak position. Note that for the evaluation of the peak position, a=1, since the large and the small anodes reveal the same position, e.g., a small anode reduces the number of counts but not the position of a peak.

Figure 23:
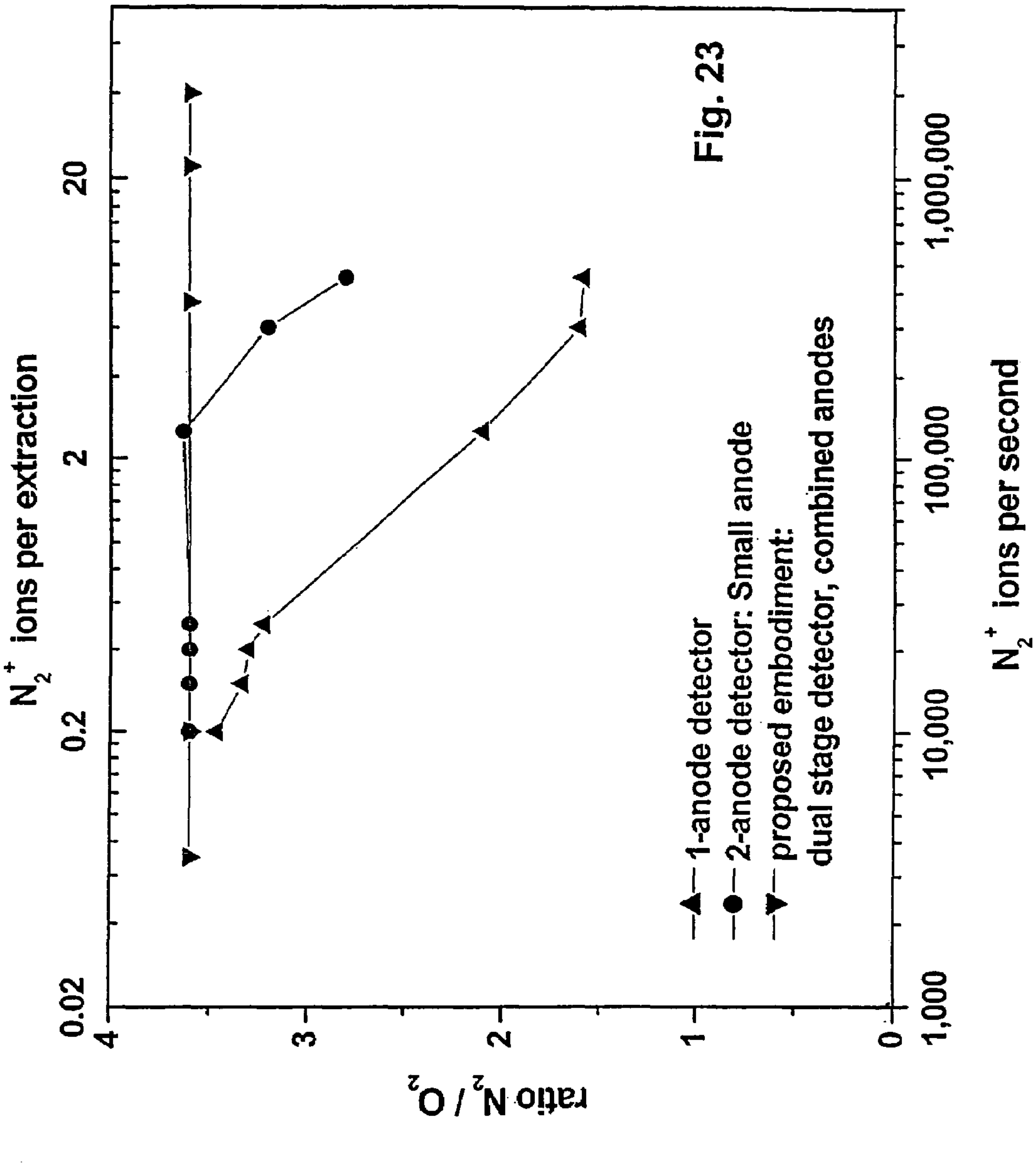
FIG. 23 presents data showing a dynamic range comparison for three different anode fractions.

The equations above can easily be adapted for any number of unequal anode arrays in an unequal anode detector. FIG. 23 shows an application of this statistical treatment to data taken from a gas sampling mass spectrometer into which atmospheric air is introduced. All of the data was taken at a TOF extraction frequency of 50 kHz. Thus, the x-axis, displaying ion count rates from 1000 $N_2$ ions per second to 2 million $N_2$ ions per second, cover the range from 0.02 to 40 ions per extraction. The y-axis displays the measured $N_2/O_2$ ratio (in air), which should be constant. FIG. 23 shows that for a conventional single anode configuration, saturation occurs at 10,000 ions per second (0.2 ions per extraction, i.e., 0.2 ions hitting the anode simultaneously). For a state of the art two-anode detector, saturation of the small anode begins at approximately 100,000 counts per second on the large anode (two ions hitting the detector simultaneously), if no additional saturation correction is applied. With the present invention, saturation can be avoided up to at least 2 million ions per second (40 ions hitting the detector simultaneously).

Figures 24A, 24B, 24C, 24D, 24E, 24F:
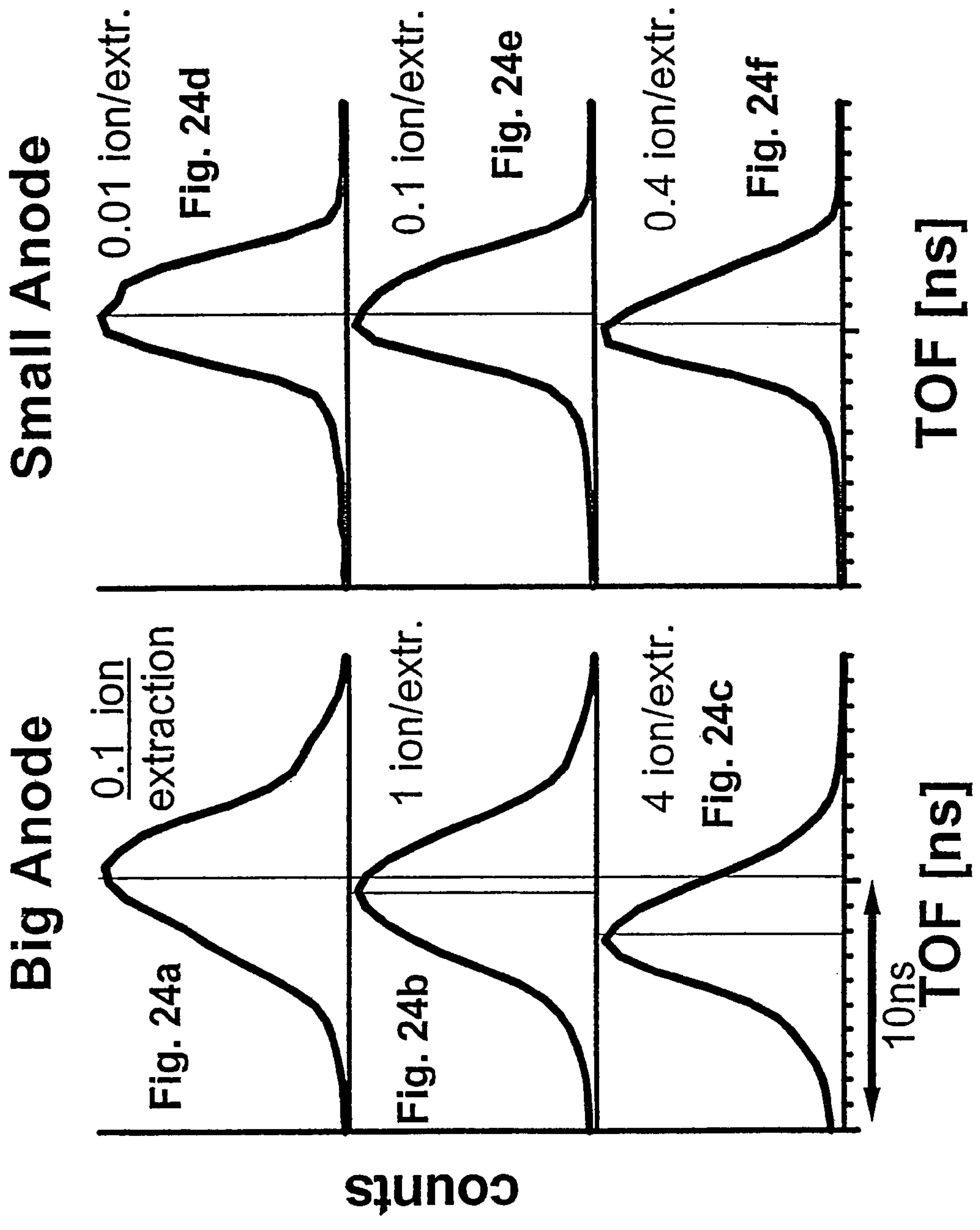
FIGS. 24*a-f* present data comparing the centroid shifts for two different anode fractions.

FIGS. 24*a-f* compare peak centroid measurements done on a large ion fraction anode (FIGS. 24*a-c*) with such measurements on a small ion fraction anode (FIGS. 24*d-f*). The ion fraction on the small fraction anode is 10 times lower than on the large fraction anode. The ion incident rate is very low on the measurement shown in FIGS. 24*a* and 24*d* (approx. 0.11 ions per extraction) to avoid any saturation effect, especially any peak shift caused by dead time effects. The ion rate is then increased to 1.1 ions per extraction (FIGS. 24*b* and 24*e*) and it is then even further increased to 4.4 ions per extraction (FIGS. 24*c* and 24*f*). It is evident that the peak measured on the anode receiving a large ion fraction (FIGS. 24*a-c*) is shifted to the left in the course of this ion rate increase. The peak measured on the small fraction anode (FIGS. 24*d-f*), however, experiences a much smaller shift. This is evidently because its saturation is 10 times less severe as it receives a ten times decreased ion rate. This measurement indicates how it is possible to increase the accuracy of a mass measurement of intense peaks using an unequal anode system, when using a dead time affected TDC data acquisition system.

CONCLUSION

The present invention, therefore, is well adapted to carry out the objects and obtain the ends and advantages mentioned above, as well as others inherent herein. All presently preferred embodiments of the invention have been given for the purposes of disclosure. Where in the foregoing description reference has been made to elements having known equivalents, then such equivalents are included as if they were individually set forth. Although the invention has been described by way of example and with reference to particular embodiments, it is not intended that this invention be limited to those particular examples and embodiments.

It is to be understood that numerous modifications and/or improvements in detail of construction may be made that will readily suggest themselves to those skilled in the art and that are encompassed within the spirit of the invention and the scope of the appended claims. For example, as is clear to those of skill in the art, the anodes used in accordance with the present invention are not required to each be associated with a single electron multiplier. In particular, a detector according to the present invention may include more than one electron multiplier with each anode detecting an unequal fraction of the incoming particle beam from one or more of those electron multipliers.

Although the techniques here have been described with respect to ion detection in time of flight mass spectrometry, those of skill in the art will recognize that the hardware and methods are equally applicable to the detection of electrons or photons. In the case of photons, a photocathode is placed in front of or incorporated onto the detector surface. These techniques are equally applicable to the cases in which a specially shaped converter surface, which might for example be flat, is used to convert energetic particles of any type into electrons that are then transported by electrostatic, magnetic, or combined electrostatic and magnetic fields onto the detector embodiments that have been described herein.

The invention may also be used with focal plane detectors in which the mass (or energy) of a particle is related to its position of impact upon the detector surface. In this case, the number of ions per unit length is summed into a spectrum. The anode saturation effects that occur in such a detector result from more than one ion impinging upon an anode during the counting cycle of the electronics.

Finally, it will be immediately apparent to those of skill in the art that the invention may also be used effectively in applications requiring analog detection of ion streams. In this case, the TDC channels behind each anode are replaced by input channels in a multiple input oscilloscope or by multiple discrete fast transient digitizers. The biases on the appropriate electron multiplier are adjusted so that the analog current response of the multiplier is a linear function of the incoming ion flux.

We claim:

1. An ion detector in a time-of-flight mass spectrometer for determining the position and time of arrival of an ion arrival signal, comprising:

a planar array comprising a plurality of micro-channel plates;

a first micro-channel plate of said planar array for producing a group of electrons in response to said ion arrival signal;

an anode proximate to said first micro-channel plate for receiving said group of electrons, thereby producing an output signal in response to said ion arrival signal; and, detection circuitry receiving said output signal and determining an approximate position of said ion arrival signal on said planar array.

2. The ion detector of claim 1 wherein said detection circuitry further determines a time-of-arrival for said ion arrival signal.

3. The ion detector of claim 1 wherein the micro-channel plates of said planar array are biased separately.

4. The ion detector of claim 1 wherein said detection circuitry combines output signals from a plurality of micro-channel plates to determine a time-of-arrival for said ion arrival signal.

5. An ion detector in a time-of-flight mass spectrometer for detecting a first ion arrival signal and a second ion arrival signal from an incoming ion flux, comprising:

a first electron multiplier with a first gain for producing a first group of electrons in response to said first ion arrival signal and for producing a second group of electrons in response to said second ion arrival signal;

a first anode for receiving said first group of electrons and for not receiving said second group of electrons, thereby producing a first output signal in response to said first ion arrival signal;

a second electron multiplier with a second gain greater than said first gain for producing a third group of electrons in response to said second group of electrons but not in response to said first group of electrons;

a second anode for receiving said third group of electrons, thereby producing a second output signal in response to said second ion arrival signal; and, analog detection circuitry connected to said first anode and said second anode for providing time-of-arrival information for said first ion arrival signal and said second ion arrival signal based on said first output signal and said second output signal.

6. The ion detector of claim 5 wherein said analog detection circuitry comprises an input channel of a multiple input oscilloscope.

7. The ion detector of claim 5 wherein said analog detection circuitry comprises a discrete fast transient digitizer.

8. The ion detector of claim 5 wherein said first gain is adjusted so that the analog current response of said first electron multiplier is a linear function of said incoming ion flux.

9. The ion detector of claim 5 wherein said analog detection circuitry comprises an amplitude to time converter.

10. The ion detector of claim 5 further comprising digital detection circuitry connected to said first anode and said second anode for providing time-of-arrival information for said first ion arrival signal and said second ion arrival signal based on said first output signal and said second output signal.

* * * * *